(12) United States Patent
Yamada

(10) Patent No.: US 10,007,050 B2
(45) Date of Patent: Jun. 26, 2018

(54) DISPLAY DEVICE WITH SURFACE LIGHT SOURCE HAVING LIGHT REDIRECTING MEMBER

(71) Applicant: Enplas Corporation, Saitama (JP)

(72) Inventor: Kyouhei Yamada, Saitama (JP)

(73) Assignee: ENPLAS CORPORATION, Saitama (JP)

(*) Notice: Subject to any disclaimer, the term of this patent is extended or adjusted under 35 U.S.C. 154(b) by 50 days.

(21) Appl. No.: 15/345,809

(22) Filed: Nov. 8, 2016

(65) Prior Publication Data

US 2017/0131458 A1  May 11, 2017

(30) Foreign Application Priority Data

Nov. 9, 2015 (JP) ................. 2015-219508
Jan. 22, 2016 (JP) ................. 2016-010764

(51) Int. Cl.
| | |
|---|---|
| *F21V 5/04* | (2006.01) |
| *G02B 3/02* | (2006.01) |
| *F21V 8/00* | (2006.01) |
| *G09F 9/35* | (2006.01) |

(Continued)

(52) U.S. Cl.
CPC ......... *G02B 6/0053* (2013.01); *G02B 6/0045* (2013.01); *G02B 6/0051* (2013.01); *G02B 6/0068* (2013.01); *G09F 9/33* (2013.01); *G09F 9/35* (2013.01); *G02F 1/133606* (2013.01); *G02F 1/133611* (2013.01); *G02F 2001/133607* (2013.01)

(58) Field of Classification Search
CPC ... F21V 5/04; F21V 5/045; F21V 5/08; F21V 13/04; G02B 3/02; G02B 2003/0093; F21Y 2105/16; F21Y 2115/10
See application file for complete search history.

(56) References Cited

U.S. PATENT DOCUMENTS

| | | | | | |
|---|---|---|---|---|---|
| 5,703,719 | A | * | 12/1997 | Chen | ............ F21V 5/04 359/515 |
| 5,865,529 | A | * | 2/1999 | Yan | ............ H01L 33/54 257/E33.059 |

(Continued)

FOREIGN PATENT DOCUMENTS

| | | | | |
|---|---|---|---|---|
| EP | 2369393 A1 | * | 9/2011 | ............ F21V 5/04 |
| JP | 2015-035336 A | | 2/2015 | |

*Primary Examiner* — Ismael Negron
(74) *Attorney, Agent, or Firm* — Brundidge & Stanger, P.C.

(57) ABSTRACT

A light redirecting member includes an incidence surface; a first total reflection surface, two light guiding parts; two second total reflection surfaces disposed at respctivee end portions of the two light guiding parts such that a distance between the second total reflection surface and a virtual plane increases as the second total reflection surface extends from the end portions; and two emission surfaces. The virtual plane includes the optical axis and a first virtual line which intersects the optical axis and extends in an extending direction of the two light guiding parts, the two second total reflection surfaces being surfaces on which light which is incident on the incidence surface and directly reaches the two second total reflection surfaces is incident at an angle equal to or greater than a critical angle, the two second total reflection surfaces being configured to reflect the light.

15 Claims, 27 Drawing Sheets

(51) Int. Cl.
*G09F 9/33* (2006.01)
*G02F 1/1335* (2006.01)

(56) References Cited

U.S. PATENT DOCUMENTS

| | | | | | |
|---|---|---|---|---|---|
| 6,097,549 | A  * | 8/2000 | Jenkins | ............... | F21V 5/04 |
| | | | | | 359/726 |
| 6,598,998 | B2 * | 7/2003 | West | ............... | H01L 33/58 |
| | | | | | 257/E33.073 |
| 6,674,096 | B2 * | 1/2004 | Sommers | ............ | H01L 33/54 |
| | | | | | 257/100 |
| 6,997,580 | B2 * | 2/2006 | Wong | ............... | H01L 33/54 |
| | | | | | 257/98 |
| 7,118,236 | B2 * | 10/2006 | Hahm | ............... | H01L 33/58 |
| | | | | | 313/512 |
| 7,134,768 | B2 * | 11/2006 | Suzuki | ............ | F21V 13/04 |
| | | | | | 362/241 |
| 7,438,444 | B2 * | 10/2008 | Pao | ............... | G02B 19/0071 |
| | | | | | 362/327 |
| 7,470,046 | B2 * | 12/2008 | Kao | ............... | G02F 1/133603 |
| | | | | | 359/626 |
| 8,545,058 | B2 * | 10/2013 | Chen | ............... | F21V 5/04 |
| | | | | | 362/268 |
| 8,979,321 | B2 * | 3/2015 | Hukkanen | ............ | F21V 5/04 |
| | | | | | 362/308 |
| 9,371,975 | B2 * | 6/2016 | Ye | ............... | F21V 5/04 |

* cited by examiner

DISPLAY DEVICE WITH SURFACE LIGHT SOURCE HAVING LIGHT REDIRECTING MEMBER

CROSS REFERENCE TO RELATED APPLICATIONS

This application is entitled to and claims the benefit of Japanese Patent Application No. 2015-219508, filed on Nov. 9, 2015, and Japanese Patent Application No. 2016-010764, filed on Jan. 22, 2016, the disclosure of which including the specification, drawings and abstract is incorporated herein by reference in its entirety.

TECHNICAL FIELD

The present invention relates to a light flux controlling member that controls a distribution of light emitted from a light emitting element, and a light-emitting device, a surface light source device and a display device including the light flux controlling member.

BACKGROUND ART

Some transmission type image display apparatuses such as liquid crystal display apparatuses and sign boards use a direct surface light source device as a backlight. In recent years, direct surface light source devices having a plurality of light emitting elements as the light source have been used (see, for example, PTL 1).

The direct light source apparatus (surface light source device) disclosed in PTL 1 includes a light source substrate, a plurality of light sources (light emitting elements) that emit blue light disposed on the light source substrate, and a wavelength conversion sheet that is disposed for the light sources with an air layer therebetween, and contains a wavelength conversion material such as a phosphor and a quantum dot. In the surface light source device disclosed in PTL 1, when blue light emitted from the light source enters the wavelength conversion sheet, a part of the blue light is converted into red light and green light by the wavelength conversion material. The blue light, red light and green light are mixed into white light, and emitted out of the wavelength conversion sheet.

CITATION LIST

Patent Literature

PTL 1
Japanese Patent Application Laid-Open No. 2015-035336

SUMMARY OF INVENTION

Technical Problem

However, the surface light source device disclosed in PTL 1 uses an expensive wavelength conversion material such as a phosphor and a quantum dot, and consequently the manufacturing cost is increased.

For the purpose of reducing the manufacturing cost, it is conceivable to use a combination of a plurality of light emitting elements having different emission light colors instead of using the wavelength conversion materials for obtaining the three primary colors. However, in the case where a combination of a plurality of light emitting elements having different emission light colors is used, the colors are required to be mixed without causing color unevenness. In particular, in the case where the thickness of the surface light source device is reduced or the case where light emitting elements (light sources) are disposed at a large pitch, it is difficult to sufficiently mix the colors, and color unevenness is easily caused.

In view of this, an object of the present invention is to provide a light flux controlling member which can reduce color unevenness without using wavelength conversion materials. In addition, another object of the present invention is to provide a light-emitting device, a surface light source device and a display device including the light flux controlling member.

Solution to Problem

To achieve the above-mentioned object, a light flux controlling member according to the embodiments of the present invention is configured to control a distribution of light emitted from a light emitting element, the light flux controlling member includes: an incidence surface on which light emitted from the light emitting element is incident; a first total reflection surface formed at a position opposite to the light emitting element with respect to the incidence surface, and configured to reflect a part of light incident on the incidence surface in opposite two directions which are substantially perpendicular to an optical axis of the light emitting element; two light guiding parts formed to face each other with the incidence surface and the first total reflection surface therebetween, and configured to guide a part of the light incident on the incidence surface and light reflected by the first total reflection surface in a direction away from the incidence surface and the first total reflection surface; two second total reflection surfaces disposed at respective end portions of the two light guiding parts and formed such that a distance between the second total reflection surface and a virtual plane increases as the second total reflection surface extends from the end portions, the virtual plane including the optical axis and a first virtual line which intersects the optical axis and extends in an extending direction of the two light guiding parts, the two second total reflection surfaces being surfaces on which light which is incident on the incidence surface and directly reaches the two second total reflection surfaces is incident at an angle equal to or greater than a critical angle, the two second total reflection surfaces being configured to reflect the light; and two emission surfaces formed on respective external surfaces of the two light guiding parts, and configured to emit light guided by the light guiding parts to outside.

To achieve the above-mentioned object, a light-emitting device according to the embodiments of the present invention includes: a light emitting element; and the light flux controlling member disposed to intersect an optical axis of the light emitting element.

To achieve the above-mentioned object, a surface light source device according to the embodiments of the present invention includes: a plurality of the light-emitting devices; and a light diffusion plate configured to allow light emitted from the light-emitting devices to pass therethrough while diffusing the light. The plurality of light-emitting devices are disposed as a light-emitting device array such that the first virtual line extends along a first direction, and a plurality of the light-emitting device arrays are disposed in a second direction perpendicular to the first direction.

To achieve the above-mentioned object, a display device according to the embodiments of the present invention includes: the surface light source device; and a member to be irradiated to which light emitted from the surface light source device is applied.

Advantageous Effects of Invention

According to the present invention, it is possible to provide a light flux controlling member which can reduce color unevenness without using wavelength conversion materials in the case where a plurality of light emitting elements having different emission light colors are used as the light source. In addition, it is possible to provide a light-emitting device, a surface light source device and a display device which include the light flux controlling member and cause less color unevenness.

DESCRIPTION OF EMBODIMENTS

In the following description, as a typical example of the surface light source device of the embodiments of the present invention, a surface light source device suitable for a backlight of a liquid crystal display apparatus will be described. Together with a member (for example, a liquid crystal panel) configured to be irradiated with light from the surface light source device, the surface light source device can be used as a display apparatus.

(Embodiment 1)
(Configuration of Surface Light Source Device)

Figure 1A:
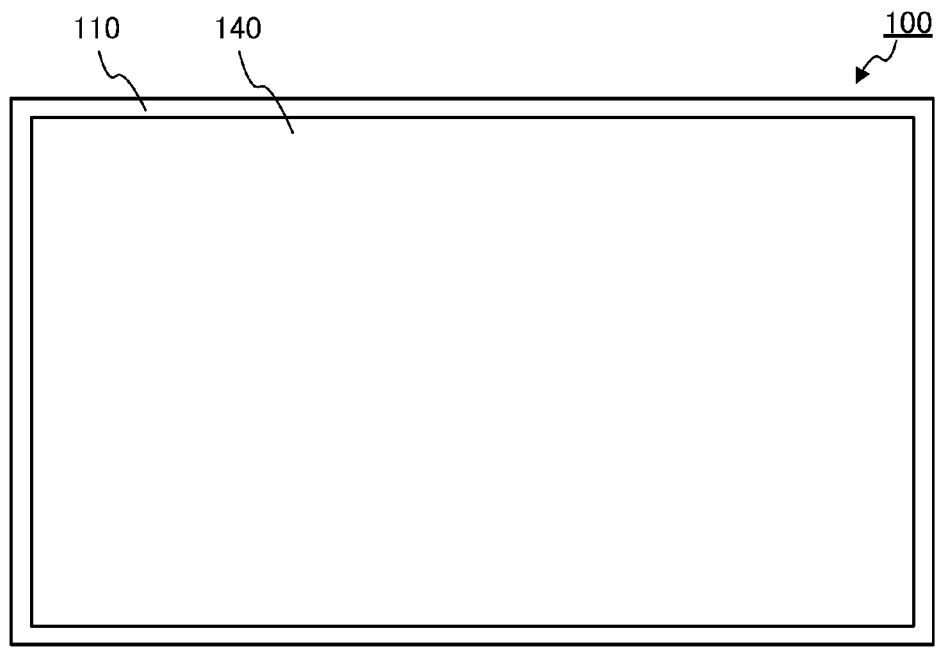
FIG. 1A and FIG. 1B illustrate a configuration of a surface light source device according to Embodiment 1 of the present invention.
Figure 1B:
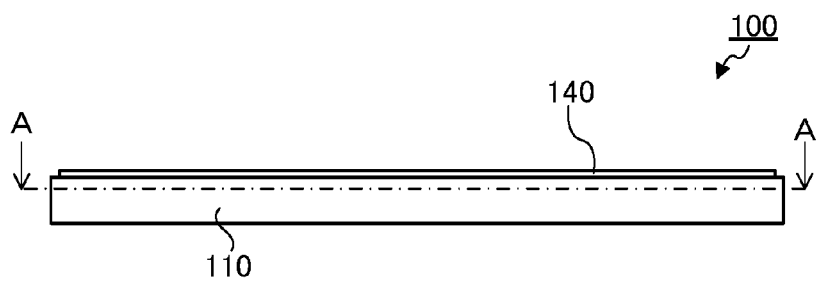
Figure 2:
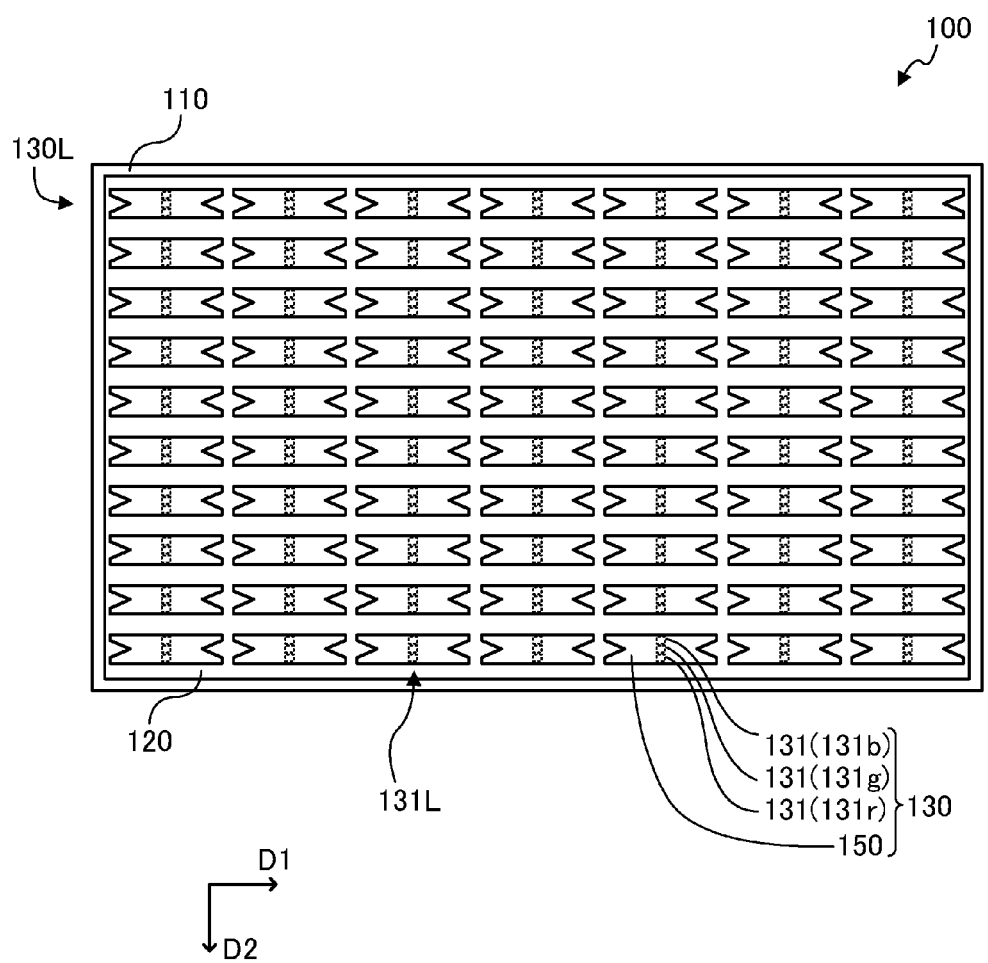
FIG. 2 is a sectional view of the surface light source device according to Embodiment 1.
Figure 3:
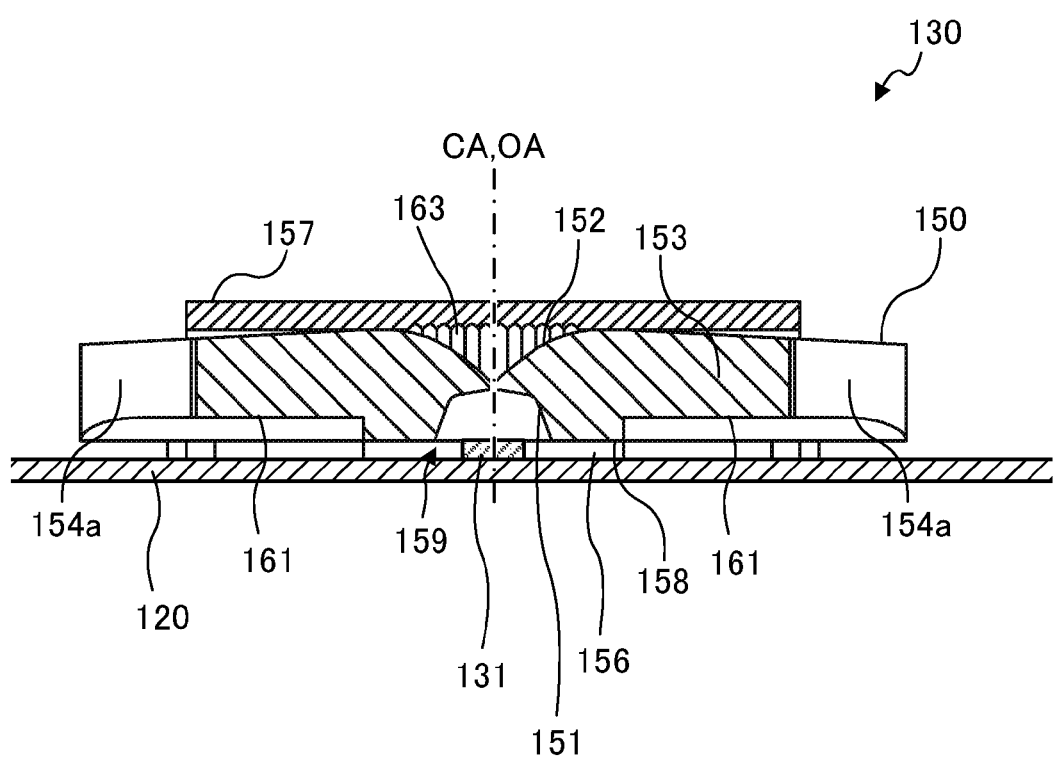
FIG. 3 is a sectional view of a light-emitting device according to Embodiment 1.
Figure 4A:
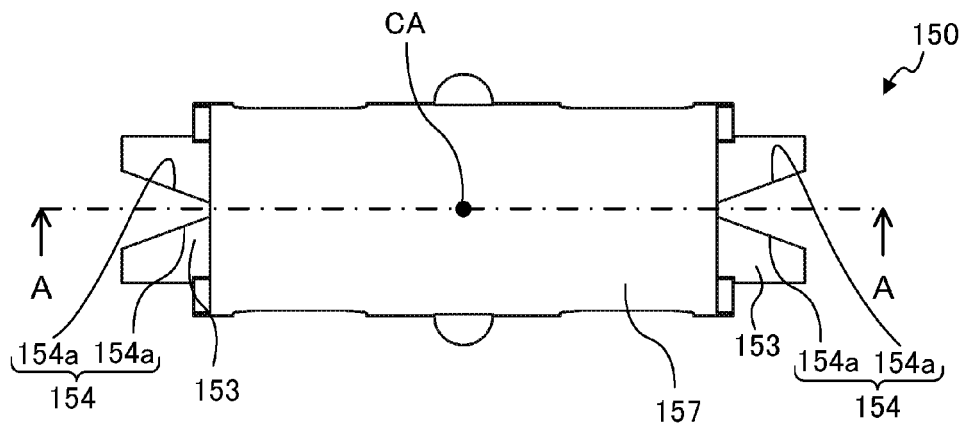
FIG. 4A to FIG. 4C illustrate a configuration of a light flux controlling member according to Embodiment 1.
Figure 4B:
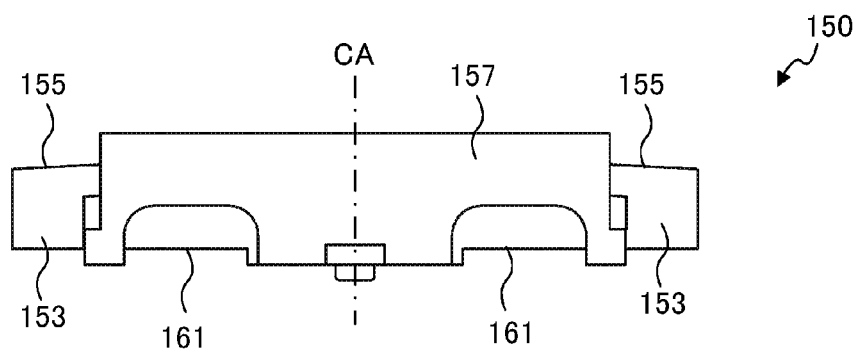
Figure 4C:
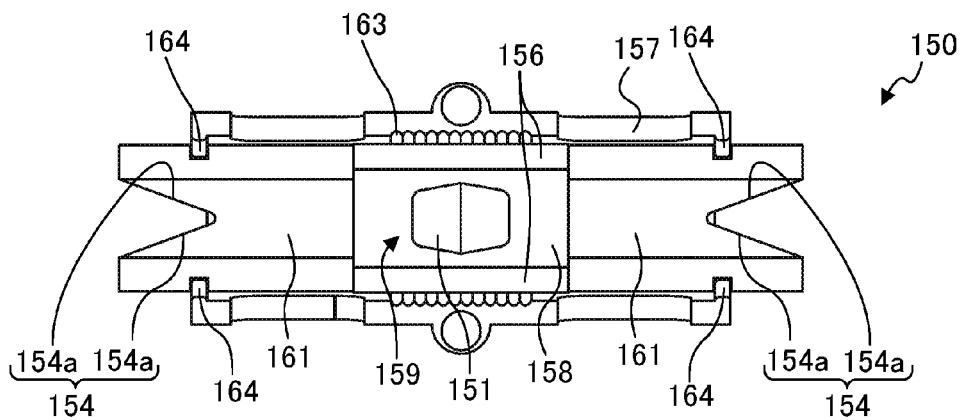
Figure 5A:
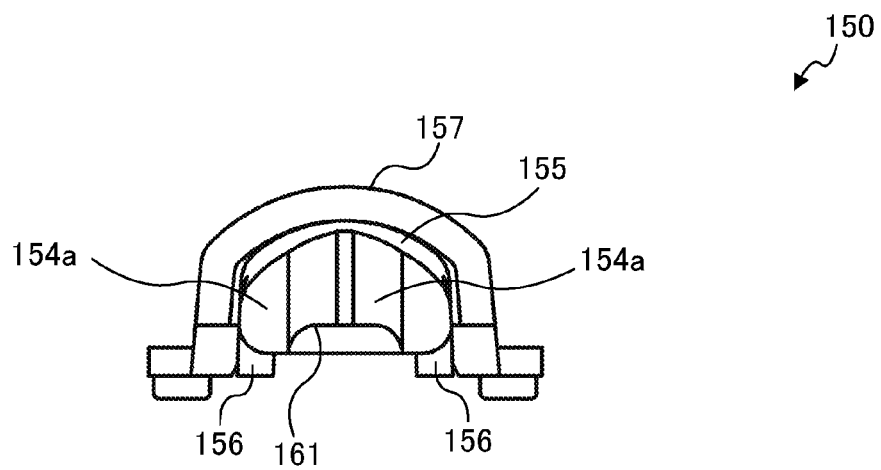
FIG. 5A and FIG. 5B illustrate a configuration of the light flux controlling member according to Embodiment 1.
Figure 5B:
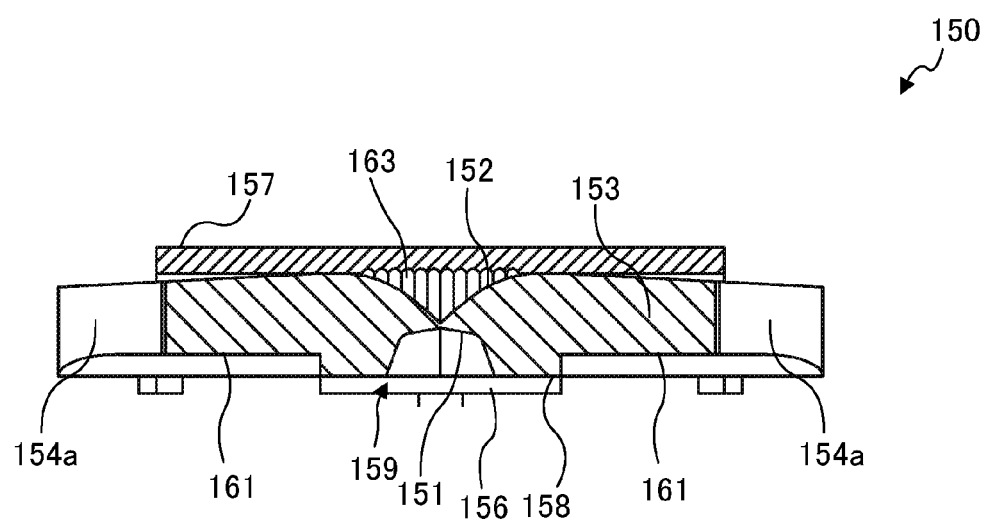
Figure 6A:
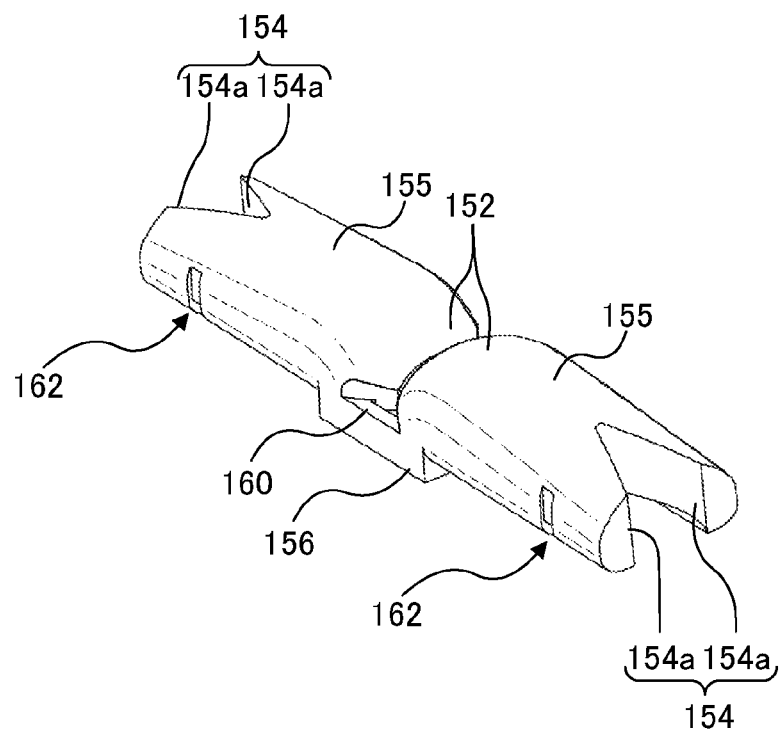
FIG. 6A and FIG. 6B are perspective views of a light flux controlling member main body according to Embodiment 1.
Figure 6B:
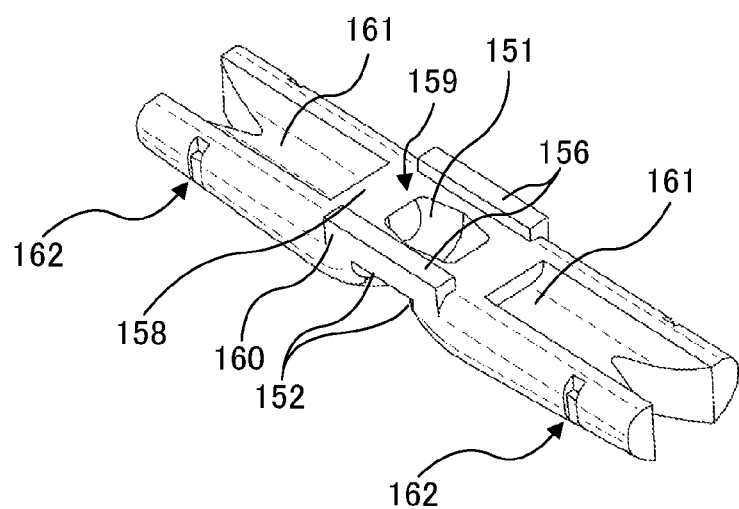
Figure 7A:
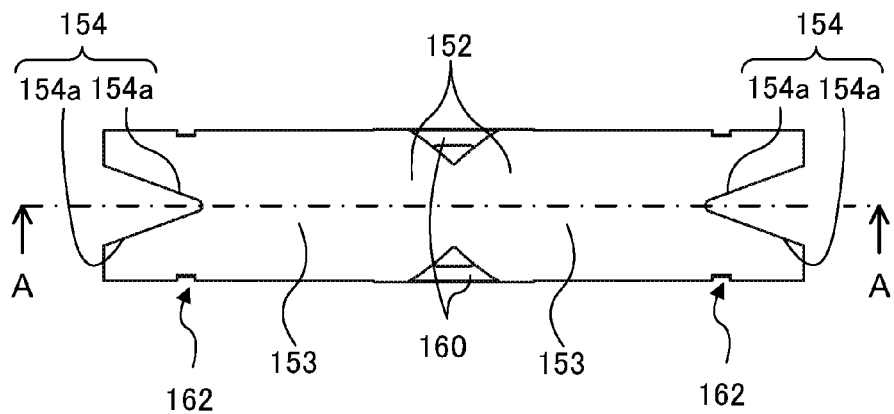
FIG. 7A to FIG. 7C illustrate a configuration of the light flux controlling member main body according to Embodiment 1.
Figure 7B:
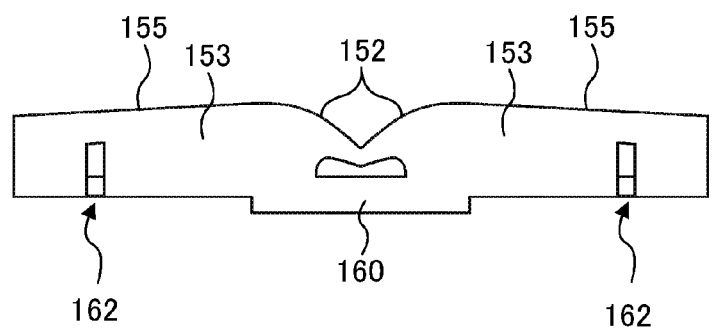
Figure 7C:
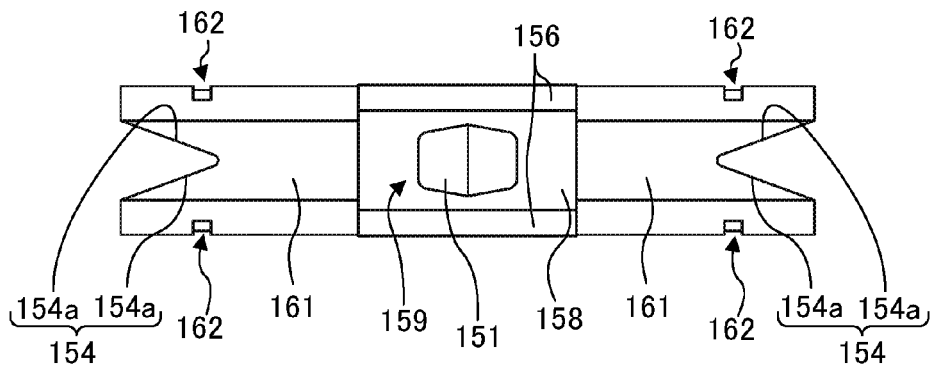
Figure 8A:
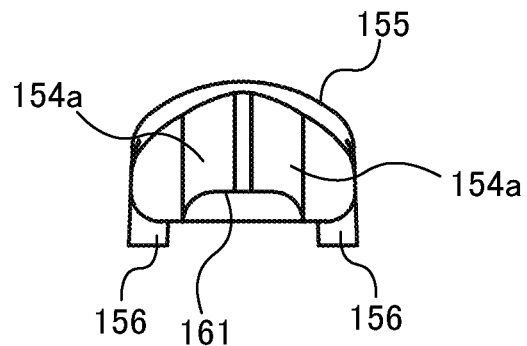
FIG. 8A and FIG. 8B illustrate a configuration of the light flux controlling member main body according to Embodiment 1.
Figure 8B:
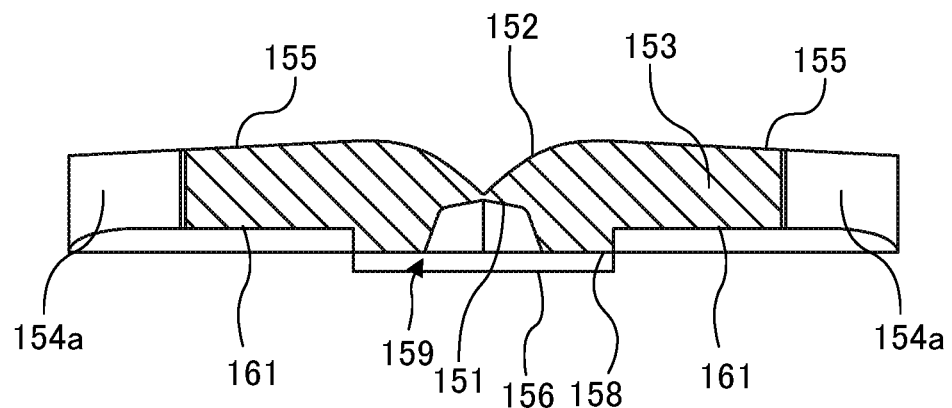

FIG. 1A to FIG. 2 illustrate a configuration of surface light source device 100 according to Embodiment 1 of the present invention. FIG. 1A is a plan view of surface light source device 100, and FIG. 1B is a front view of surface light source device 100. FIG. 2 is a sectional view taken along line A-A of FIG. 1B. FIG. 3 is a sectional view of light-emitting device 130. In addition, FIG. 4A to FIG. 8B illustrate a configuration of light flux controlling member 150 according to Embodiment 1. FIG. 4A is a plan view of light flux controlling member 150, and FIG. 4B is a front view of light flux controlling member 150, and FIG. 4C is a bottom view of light flux controlling member 150. FIG. 5A is a right side view of light flux controlling member 150, and FIG. 5B is a sectional view taken along line A-A of FIG. 4A. FIG. 6A is a perspective view of light flux controlling member 150 (light flux controlling member main body) as viewed from the upper side in which scattering member 157 is dismounted, and FIG. 6B is a perspective view of light flux controlling member 150 with bottom surface 158 facing the upper side in which scattering member 157 is dismounted. FIG. 7A is a plan view of light flux controlling member 150 in which scattering member 157 is dismounted, FIG. 7B is a front view of light flux controlling member 150, and FIG. 7C is a bottom view of light flux controlling member 150. FIG. 8A is a right side view of light flux controlling member 150 in which scattering member 157 is dismounted, and FIG. 8B is a sectional view taken along line A-A of FIG. 7A.

As illustrated in FIG. 1A to FIG. 2, surface light source device 100 includes housing 110, substrate 120, a plurality of light-emitting devices 130 and light diffusion plate 140.

Housing 110 is a cuboid box for housing substrate 120 and a plurality of light-emitting devices 130 therein. An opening part is provided at at least a part of one surface of housing 110. Housing 110 is composed of a top plate, a bottom plate opposite to the top plate, and four side plates that connect the top plate and the bottom plate. In the top plate, an opening part having a rectangular shape that serves as a light emission region is formed. This opening part is closed with light diffusion plate 140. The size of the opening part corresponds to the size of the light emission region (light emitting surface) formed in light diffusion plate 140, and is, for example, 400 mm×700 mm (32 inch). The bottom plate and light diffusion plate 140 are parallel to each other. The height (space thickness) from the surface of the bottom plate to light diffusion plate 140 is, but not limited to, about 10 to 25 mm. Housing 110 is composed of a resin such as polymethylmethacrylate (PMMA) and polycarbonate (PC), a metal such as stainless steel and aluminum, or the like, for example.

Substrate 120 is a flat plate for disposing light-emitting devices 130 in housing 110 at a predetermined interval. Substrate 120 is disposed on the bottom plate of housing 110. The number of light-emitting devices 130 disposed on substrate 120 is not limited. The number of light-emitting devices 130 disposed on substrate 120 is appropriately set based on the size of the light emission region (light emitting surface) defined by the opening part of housing 110. The surface of substrate 120 on which to dispose light-emitting devices 130 is configured to reflect light arriving at the surface toward light diffusion plate 140.

Each light-emitting device 130 includes a plurality of light emitting elements 131, and light flux controlling member 150. Each light-emitting device 130 is disposed such that optical axis OA of light emitted from light emitting element 131 is set along the normal to the surface of substrate 120 (see FIG. 3). Light-emitting devices 130 are disposed as light-emitting device array 130L such that the major axis (the first virtual line described later) of light-emitting device 130 (light flux controlling member 150) extends along first direction D1. In addition, a plurality of the light-emitting device arrays 130L are disposed in second direction D2 orthogonal to first direction D1 (see FIG. 2). In addition, as viewed along second direction D2, a light-emitting device 130 is disposed to overlap another light-emitting device 130 included in a light-emitting device array 130L adjacent to a light-emitting device array 130L that includes the light-emitting device 130 in second direction D2. Here, "the optical axis of the light emitting element" corresponds to the travelling direction of light at the center of the stereoscopic light flux from light emitting element 131 located at the center in a plurality of light emitting elements 131 of light-emitting element array 131L of light-emitting device 130.

Light emitting element 131 is the light source of surface light source device 100 (and light-emitting device 130). Light emitting element 131 is disposed on substrate 120. Light emitting element 131 is a light-emitting diode (LED), for example. One or more light emitting elements 131 are disposed in one light-emitting device 130. In the present embodiment, three light emitting elements 131 are disposed in one light-emitting device 130. In addition, the colors of the emission light emitted from the light emitting elements 131 are not limited. Further, in light-emitting device 130 having a plurality of light emitting elements 131, the colors of the emission light emitted from light emitting elements 131 may be different from each other, or identical to each other. In the present embodiment, one light-emitting device 130 has light emitting element 131r that emits red light, light emitting element 131g that emits green light and light emitting element 131b that emits blue light. In addition, three light emitting elements 131r, 131g, and 131b in light-emitting device 130 are disposed along second direction D2 perpendicular to first direction D1 so as to form light-emitting element array 131L (see FIG. 2).

The order of light emitting elements 131 in one light-emitting device 130 and the order of light emitting elements 131 in another light-emitting device 130 adjacent to the one light-emitting device 130 in first direction D1 or in second direction D2 may be identical to each other or different from each other. In the present embodiment, the order of light emitting elements 131 is identical to each other between two light-emitting devices 130 adjacent to each other in second direction D2. On the other hand, the order of light emitting elements 131 is different from each other between two light-emitting devices 130 adjacent to each other in first direction D1.

To be more specific, in one light-emitting device 130, light emitting element 131b that emits blue light, light emitting element 131g that emits green light, and light emitting element 131r that emits red light are disposed in this order in second direction D2. In addition, in another light-emitting device 130 adjacent to the one light-emitting device 130 in second direction D2, light emitting elements 131 are disposed in the same order.

On the other hand, in another light-emitting device 130 adjacent to the one light-emitting device 130 in first direction D1, light emitting element 131r that emits red light, light emitting element 131g that emits green light, and light emitting element 131b that emits blue light are disposed in this order.

Light flux controlling member 150 controls the distribution of light emitted from light emitting element 131. As illustrated in FIG. 4A to FIG. 8B, light flux controlling member 150 includes incidence surface 151, first total reflection surface 152, two light guiding parts 153, two second total reflection surfaces 154, two emission surfaces 155, leg part 156, and scattering member 157.

A part of light emitted from light emitting element 131 is incident on incidence surface 151. Incidence surface 151 is the internal surface of first recess 159 formed at a center portion of bottom surface (light emitting element 131 side surface) 158 of light flux controlling member 150. The shape of the internal surface of first recess 159 is not limited. The internal surface of first recess 159 may be an edgeless curved surface such as a hemispherical surface and a semi-ellipsoidal surface, or an edged surface having a top surface and a side surface. In the present embodiment, the internal surface of first recess 159 includes a top surface and a side surface.

First total reflection surface 152 is disposed on the side opposite (light diffusion plate 140 side) to light emitting element 131 with respect to incidence surface 151. First total reflection surface 152 reflects a part of incident light from incidence surface 151 in opposite two directions substantially perpendicular to optical axis OA of light emitting element 131 (central axis CA of light flux controlling member 150). First total reflection surface 152 is formed such that, in a cross-section taken along a first virtual plane including optical axis OA and a first virtual line that intersects optical axis OA and extends along the extending direction of two light guiding parts 153, the height from bottom surface 158 (substrate 120) increases from central axis CA toward the both end portions. To be more specific, first total reflection surface 152 is formed such that, in a cross-section taken along the first virtual plane, the inclination of the tangent gradually decreases from central axis CA toward the end portion.

Two light guiding parts 153 are formed at opposing positions with respect to incidence surface 151 and first total reflection surface 152. Light guiding part 153 emits a part of incident light from incidence surface 151 and light reflected by first total reflection surface 152 to the outside little by little while guiding the light. The surface of light guiding part 153 on light diffusion plate 140 side functions as emission surface 155 that emits the guided light to the outside. Scattering members such as beads may be dispersed in light guiding part 153 from the view point of uniformization of the quantity of the light emitted from emission surface 155.

Two second total reflection surfaces 154 are disposed at respective end portions (end portions remote from central axis CA) of two light guiding parts 153. Two second total reflection surfaces 154 are formed such that a distance between the second total reflection surface and the first virtual plane increases as the second total reflection surface extends from the end portions, the first virtual plane including the optical axis and a first virtual line which intersects optical axis OA (central axis CA) and extends in an extending direction of the two light guiding parts. Second total reflection surface 154 is a surface on which light which is incident on incidence surface 151 and directly reaches second total reflection surfaces 154 is incident at an angle equal to or greater than a critical angle, and second total reflection surface 154 reflects the light. The shape of second total reflection surface 154 is not limited as long as a part of light incident on incidence surface 151 is incident on second total reflection surface 154 at an angle equal to or greater than a critical angle. In the present embodiment, in a cross-section taken along the second virtual plane perpendicular to optical axis OA, second total reflection surface 154 includes two inclined surfaces 154a, 154a that are formed to go toward the first virtual plane from an end portion of light guiding part 153 toward optical axis OA (central axis CA). In other words, in the present embodiment, second total reflection surface 154 is opposite two internal surfaces of a V-shaped groove disposed in a direction along optical axis OA (central axis CA) at an end surface of light guiding part 153. A part of light advanced in light guiding part 153 reaches second total reflection surface 154. The light reaching second total reflection surface 154 is incident on second total reflection surface 154 and reflected by second total reflection surface 154 at various angles. At this time, with the incidence and reflection at second total reflection surface 154, the colors of red, blue, and green emitted from light emitting element 131 are mixed.

In the extending direction of the first virtual line, emission surface 155 is disposed at a position remote from central axis CA relative to first total reflection surface 152. Emission surface 155 emits to the outside: light which is incident on incidence surface 151 and advanced in light guiding part 153 after being reflected by first total reflection surface 152; light which is incident on the incidence surface and advanced in light guiding part 153 without being reflected by first total reflection surface 152; and light which is incident on the incidence surface and advanced in light guiding part 153 without being reflected by first total reflection surface 152, and, totally reflected by second total reflection surface 154. In addition, emission surface 155 may be subjected to a light diffusion treatment (for example, roughening treatment).

The shape of light guiding part 153 is not limited. In the present embodiment, light guiding part 153 is a member having a rod-like shape. The cross-sectional area of light guiding part 153 in the minor axis direction is not limited. In the present embodiment, the cross-sectional area of light guiding part 153 in the minor axis direction decreases as the distance from first total reflection surface 152 increases in the region from first total reflection surface 152 to the end portion of second total reflection surfaces 154 on central axis CA side. In addition, two light guiding parts 153 are continuously connected by two reinforcement members 160. Two leg parts 156 are disposed at lower portions of two reinforcement members 160. Further, guide engagement groove 162 is formed on each of the side surfaces of two light guiding parts 153.

In addition, second recess 161 is formed on bottom surface (the surface on light emitting element 131 side) 158 of light guiding part 153. With second recess 161, sink marks can be reduced at the time of injection molding, and the manufacturing cost can be reduced. Each of two second recesses 161 is formed along the longitudinal axial direction of light flux controlling member 150 (the extending direction of the first virtual line), and is not communicated with first recess 159. The size and the shape of second recess 161 are not limited as long as a part of the light emitted from light emitting element 131 can directly reach second total reflection surface 154, and the strength required for light flux controlling member 150 can be ensured. In addition, in the present embodiment, as long as the above-described functions can be ensured, the shape of second recess 161 in a plan view and the depth of second recess 161 are not limited and may be appropriately set. It is to be noted that in the case where light flux controlling member 150 is formed by injection molding, it is preferable to form second recess 161 in a region where sink marks are possibly left.

Reinforcement member 160 improves the strength of light flux controlling member 150. The position and the shape of reinforcement member 160 are not limited as long as the function of first total reflection surface 152 of light flux controlling member 150 is not significantly impaired, and the strength of light flux controlling member 150 can be improved. In the present embodiment, reinforcement member 160 is disposed on the side of bottom surface (the surface on light emitting element 131 side) 158 of light flux controlling member so as to continuously connecting light guiding parts 153.

In the direction along the first virtual line, guide engagement grooves 162 are disposed at positions remote from central axis CA relative to reinforcement member 160. Guide engagement groove 162 is a groove for setting the position of scattering member 157 with respect to light flux controlling member 150 by being engaged with engagement protrusion 164 of scattering member 157 described later.

Scattering member 157 is disposed on the side opposite to light emitting element 131 with respect to incidence surface 151. Scattering member 157 is a member that is provided separately from the light flux controlling member main body including incidence surface 151, first total reflection surface 152, light guiding part 153, second total reflection surface 154 and emission surface 155. Mainly, scattering member 157 allows transmitted light which has not been reflected by first total reflection surface 152 to pass therethrough while diffusing the light. The shape of scattering member 157 is not limited as long as the above-described function can be ensured. Examples of the shape of scattering member 157 include a half cylindrical shape, a temple bell-like shape (inverted U-shape) and the like. In the present embodiment, scattering member 157 has a bell-like shape. In addition, the size of scattering member 157 is also not limited as long as the above-described function can be ensured. Scattering member 157 may be disposed to cover only the upper part of first total reflection surface 152, or may be disposed to cover first total reflection surface 152 and light guiding part 153. In the present embodiment, scattering member 157 is formed to cover first total reflection surface 152, a part of emission surface 155, and an end portion of second total reflection surface 154 on central axis CA side. A plurality of prism rows 163 having a substantially triangular cross-sectional shape or a semicircular cross-sectional shape are disposed on the internal surface of scattering member 157. Engagement protrusions 164 that engage with guide engagement grooves 162 are disposed at end portions of scattering member 157 on light emitting element 131 side.

The material of light flux controlling member 150 is not limited as long as light of a desired wavelength can pass therethrough. Examples of the material of light flux controlling member 150 include: light transmissive resins such as polymethylmethacrylate (PMMA), polycarbonate (PC), and epoxy resin (EP); or glass.

Light diffusion plate 140 is disposed to close the opening part of housing 110. Light diffusion plate 140 is a plate-shaped member having a light diffusing property and allows the light emitted from light flux controlling member 150 to pass therethrough while diffusing the light. Normally, the size of light diffusion plate 140 is substantially the same as that of the member to be irradiated such as a liquid crystal panel. For example, light diffusion plate 140 is formed of a light transmissive resin such as polymethylmethacrylate (PMMA), polycarbonate (PC), polystyrene (PS), and styrene methyl methacrylate copolymerization resin (MS). In order to provide a light diffusing property, minute irregularities are formed on the surface of light diffusion plate 140, or diffusing members such as beads are dispersed in light diffusion plate 140.

(Simulation)

Next, the arrival position and the light path of light emitted from light emitting element 131 disposed at the center of light-emitting element array 131L of light-emitting device 130 were simulated.

First, the arrival positions on light diffusion plate 140 and substrate 120 of light emitted from light emitting element 131 at respective emission angles whose travelling directions have been controlled by light flux controlling member 150 were simulated. In the simulation, light-emitting device 130 in which light flux controlling member 150 provided with scattering member 157 fixed on substrate 120 on which three light emitting elements 131 are fixed was used. In addition, the distance between substrate 120 and light diffusion plate 140 was set to 12 mm. Further, only one light emitting element 131 disposed at the center portion of three light emitting elements 131 was turned on. It is to be noted that, in this simulation, the light path in light-emitting device 130 is symmetric about central axis CA in the horizontal direction in FIG. 4A (longitudinal axial direction) and in the vertical direction in FIG. 4A (minor axis direction), and therefore the arrival position of light emitted in the right upward direction with respect to central axis CA in FIG. 4A was simulated. In addition, the arrival positions of light emitted at four emission angles of 30, 45, 60 and 75 degrees to optical axis OA were simulated. In addition, the arrival positions of light having seven angles of 0 (which corresponds to light parallel to the first virtual line), 5, 10, 15, 20, 25, and 30 degrees to the first virtual line (28 patterns in total) in a cross-section taken along the second virtual plane perpendicular to optical axis OA were simulated for each emission angle. In addition, for comparison, the same simulation was performed with a light-emitting device (hereinafter also referred to as "the light-emitting device according to the comparative example") having a light flux controlling member (omitted in the drawing) provided with no second total reflection surface 154.

FIGS. 9, 11, 13 and 15 show the arrival positions on light diffusion plate 140 and substrate 120 of light emitted from light emitting element 131 at respective emission angles whose travelling directions have been controlled by light flux controlling member 150.

Figure 9A:
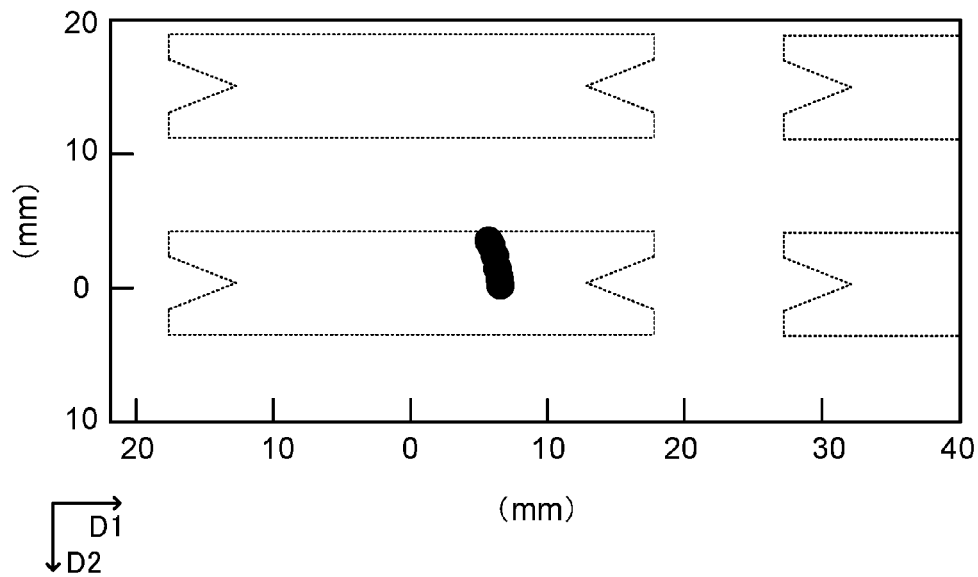
FIG. 9A and FIG. 9B illustrate arrival positions on a light diffusion plate and a substrate of light emitted from the light emitting element at an emission angle of 30 degrees whose light flux has been controlled by the light flux controlling member.
Figure 9B:
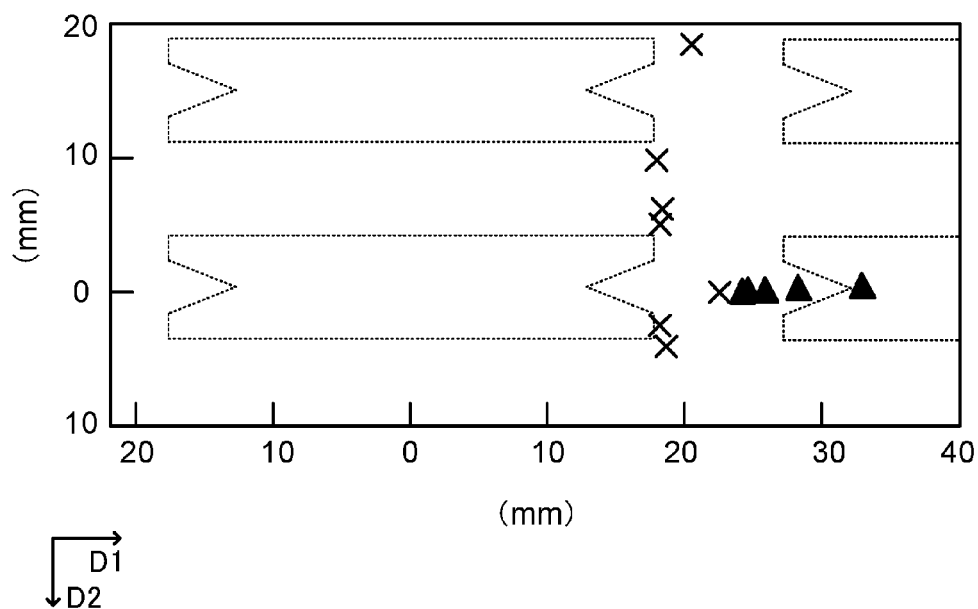
Figure 10A:
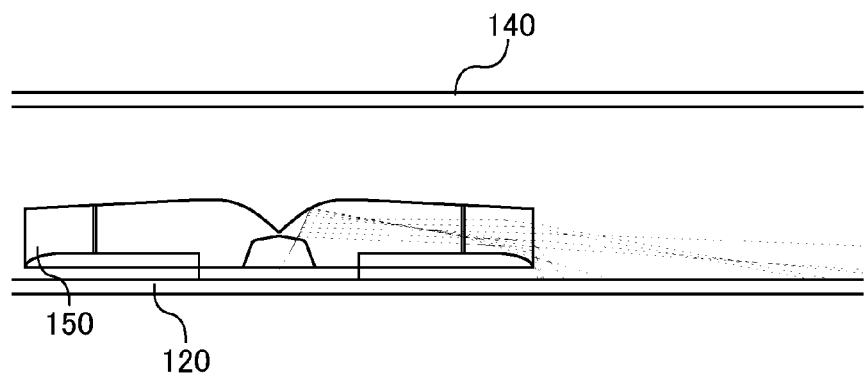
FIG. 10A and FIG. 10B illustrate light paths of light emitted from a light emitting element at an emission angle of 30 degrees in the light-emitting device.
Figure 10B:
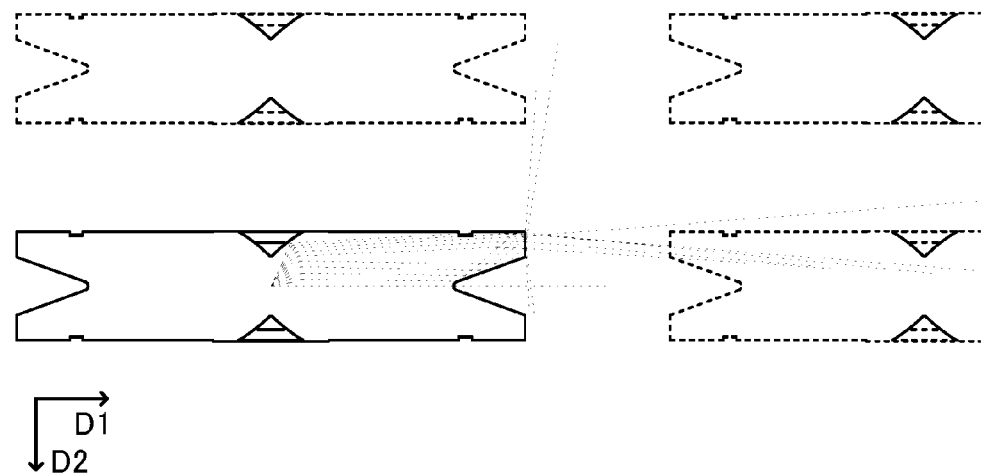
Figure 11A:
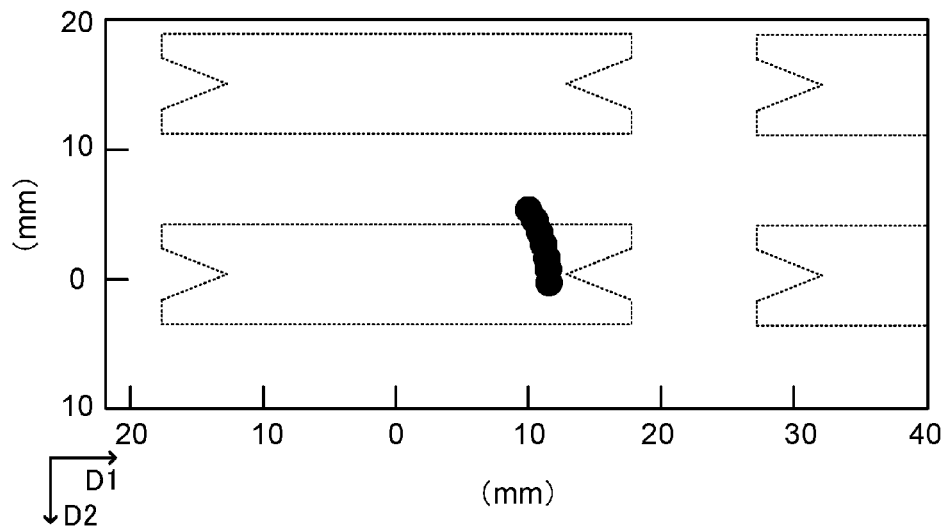
FIG. 11A and FIG. 11B illustrate arrival positions on the light diffusion plate and the substrate of light emitted from the light emitting element at an emission angle of 45 degrees whose light flux has been controlled by the light flux controlling member.
Figure 11B:
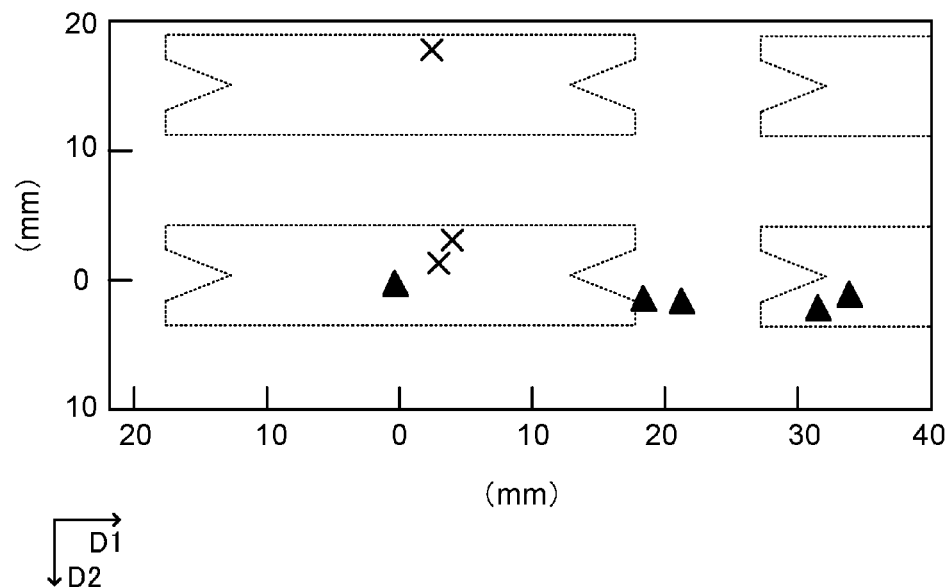
Figure 12A:
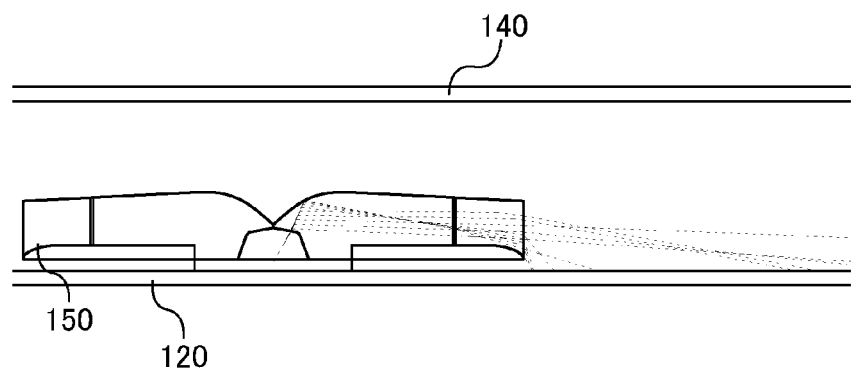
FIG. 12A and FIG. 12B illustrate light paths of light emitted from the light emitting element at an emission angle of 45 degrees in the light-emitting device.
Figure 12B:
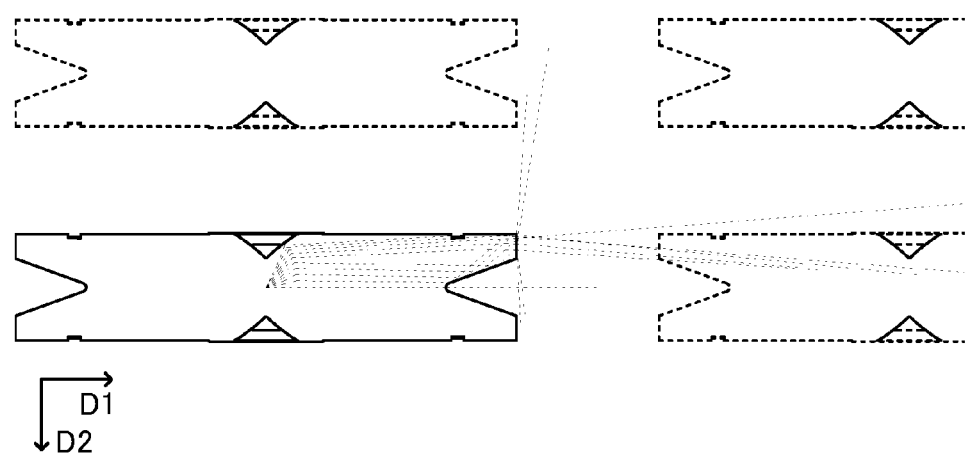
Figure 13A:
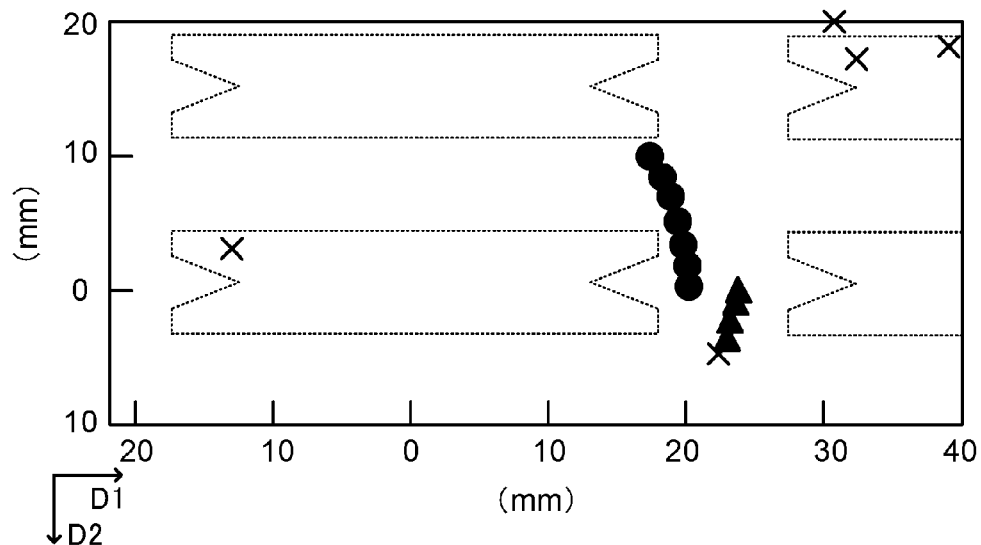
FIG. 13A and FIG. 13B illustrate arrival positions on light diffusion plate and substrate of light emitted from the light emitting element at an emission angle of 60 degrees whose light flux has been controlled by the light flux controlling member.
Figure 13B:
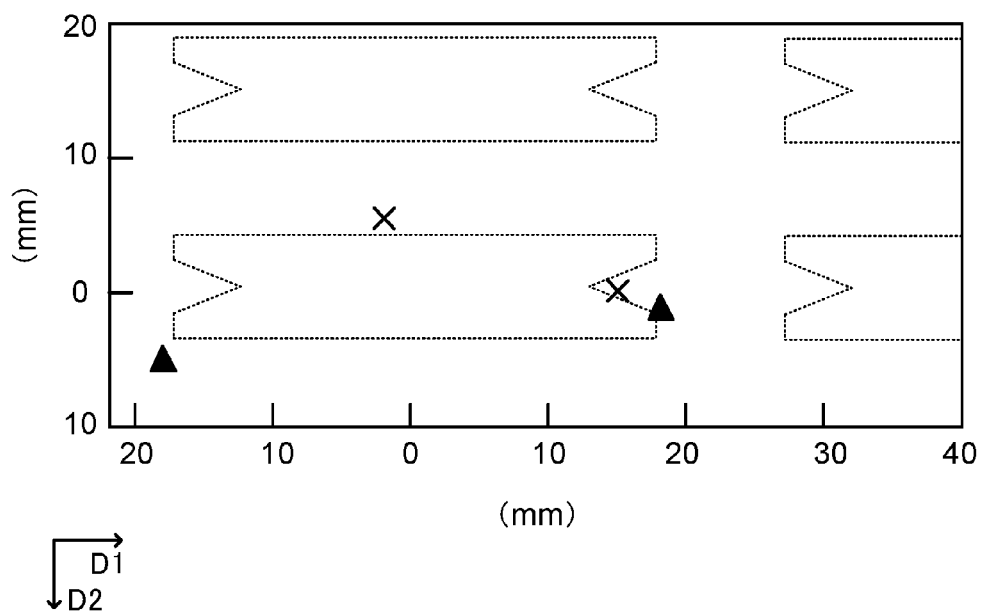
Figure 14A:
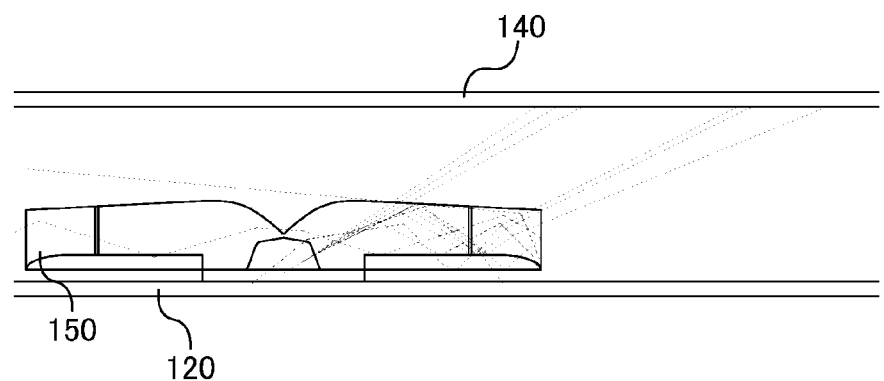
FIG. 14A and FIG. 14B illustrate light paths of light emitted from the light emitting element at an emission angle of 60 degrees in the light-emitting device.
Figure 14B:
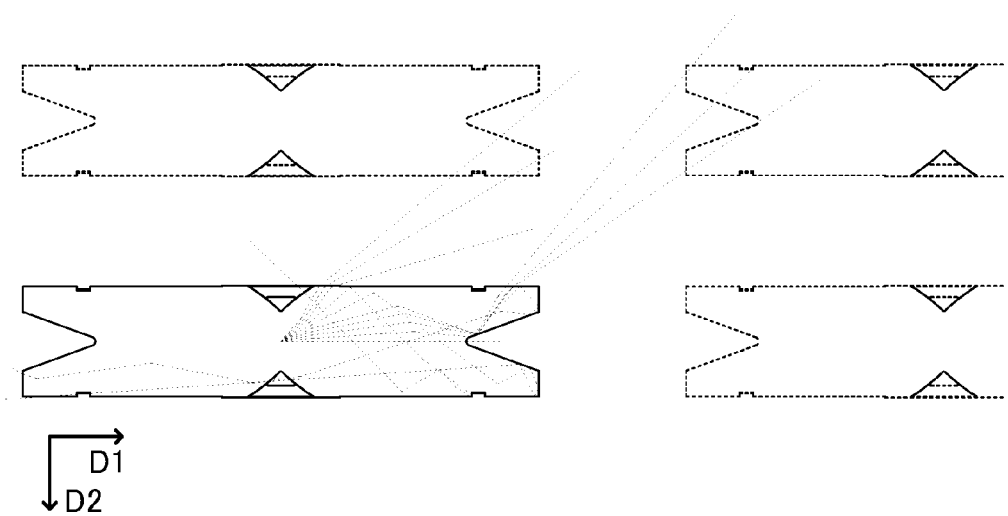
Figure 15A:
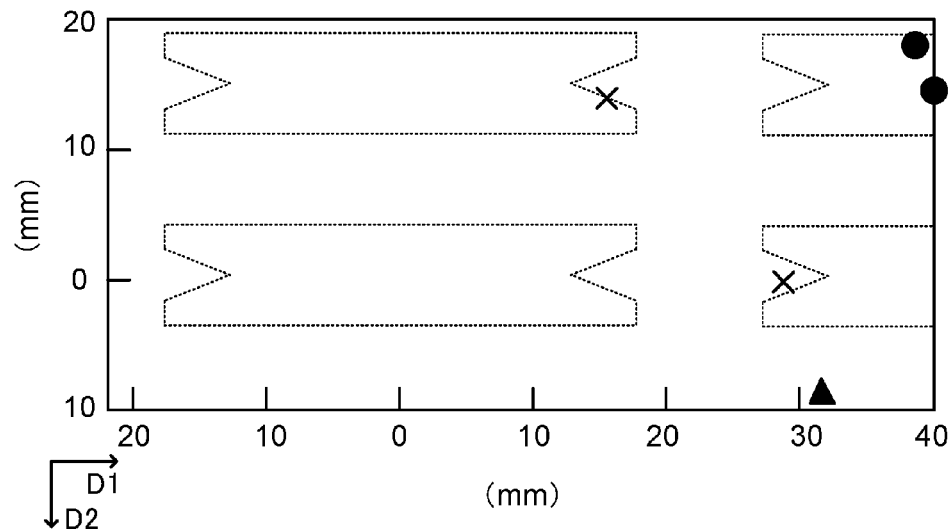
FIG. 15A and FIG. 15B illustrate arrival positions on the light diffusion plate and the substrate of light emitted from the light emitting element at an emission angle of 75 degrees whose light flux has been controlled by the light flux controlling member.
Figure 15B:
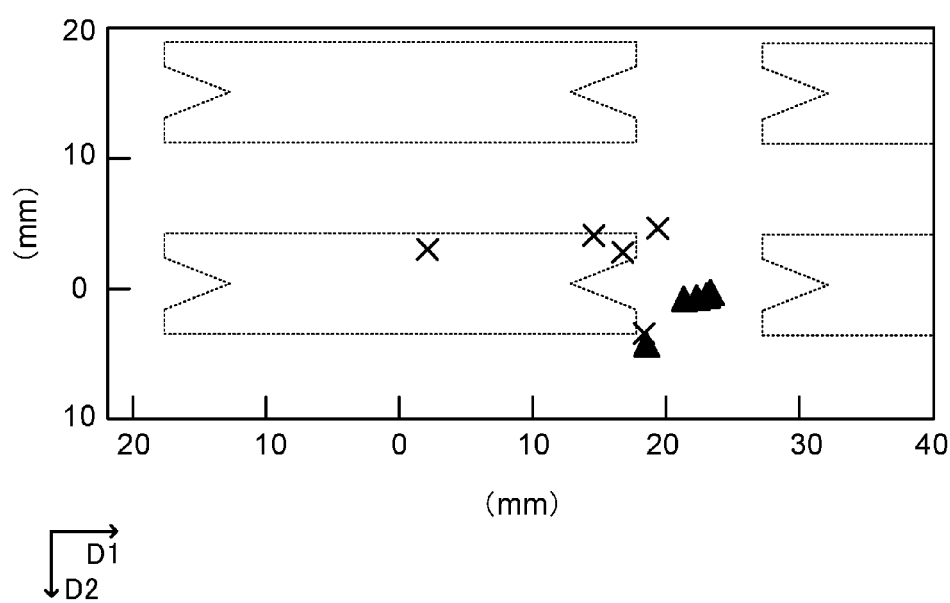
Figure 16A:
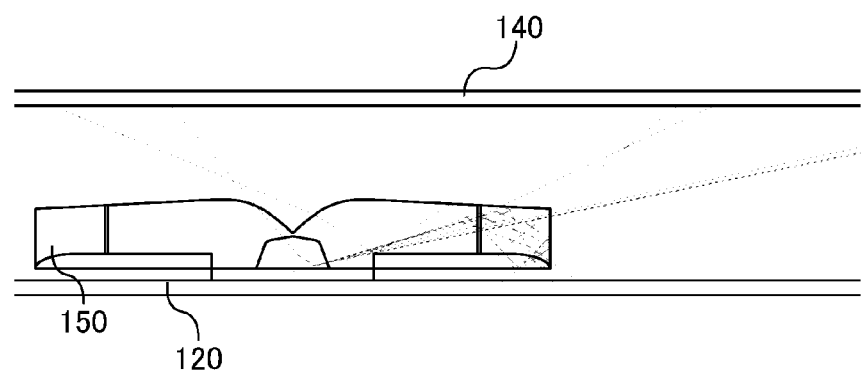
FIG. 16A and FIG. 16B illustrate light paths of light emitted from the light emitting element at an emission angle of 75 degrees in the light-emitting device.
Figure 16B:
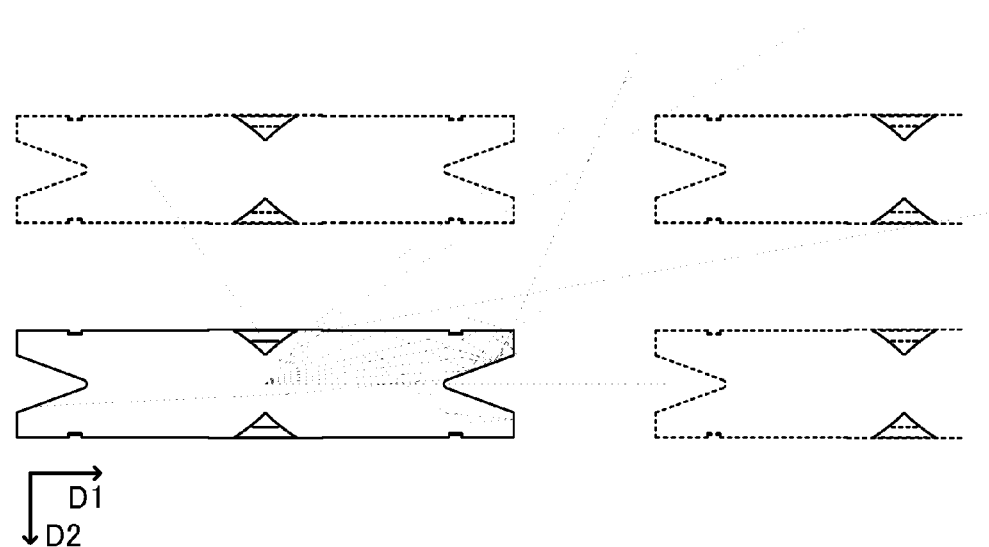

FIG. 9A illustrates the arrival position on light diffusion plate 140 of light emitted from the light emitting element at the emission angle of 30 degrees whose light flux has been controlled by the light flux controlling member, and FIG. 9B illustrates the arrival position of the light on substrate 120. FIG. 11A illustrates the arrival position on light diffusion plate 140 of light emitted from the light emitting element at the emission angle of 45 degrees whose light flux has been controlled by the light flux controlling member, and FIG. 11B illustrates the arrival position of the light on substrate 120. FIG. 13A illustrates the arrival position on light diffusion plate 140 of light emitted from the light emitting element at the emission angle of 60 degrees whose light flux has been controlled by the light flux controlling member, and FIG. 13B illustrates the arrival position of the light on substrate 120. FIG. 15A illustrates the arrival position on light diffusion plate 140 of light emitted from the light emitting element at the emission angle of 75 degrees whose light flux has been controlled by the light flux controlling member, and FIG. 15B illustrates the arrival position of the light on substrate 120.

In FIGS. 9, 11, 13 and 15, the abscissa and the ordinate indicate the distance (mm) from the light emission point (the center of light emitting element 131) in the direction orthogonal to light axis OA. In addition, in FIGS. 9, 11, 13 and 15, the position of light-emitting device 130 in plan view is indicated with the dotted line. In FIGS. 9, 11, 13 and 15, the X marks indicate the arrival positions of the light emitted from light-emitting device 130 according to the present embodiment, the black triangle marks indicate the arrival positions of light emitted from the light-emitting device according to the comparative example, and the black circle marks indicate the arrival positions of light in the case where only light emitting element 131 is disposed on substrate 120.

Next, the light path in light-emitting device 130 of light emitted from light emitting element 131 at each emission angle was simulated. This simulation differs from the above-mentioned simulation in number of light beams in a plane taken along the second virtual plane. It is to be noted that, only results obtained with emission angles of 45 and 75 degrees are shown herein for the light-emitting device according to the comparative example.

Figure 17C:
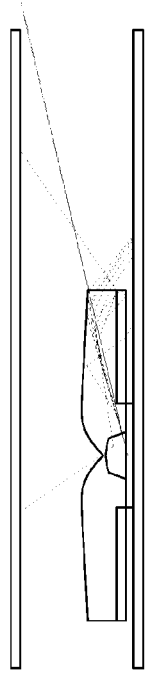
FIG. 17A to FIG. 17D illustrate light paths in a light-emitting device according to a comparative example.
Figure 17D:
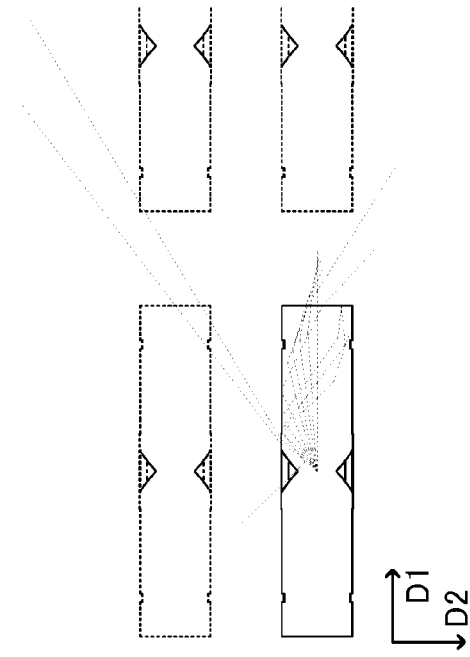
Figure 17A:
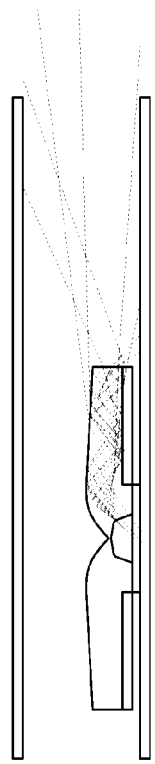
Figure 17B:
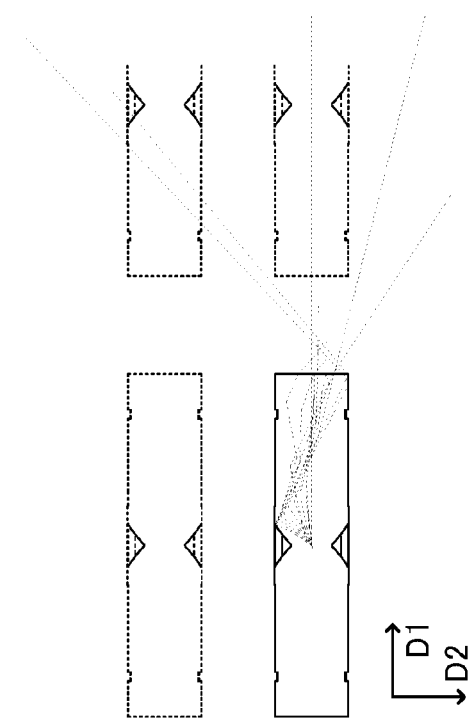

FIGS. 10, 12, 14 and 16 illustrate light paths of light emitted from light emitting element 131 at each emission angle in light-emitting device 130. In addition, FIG. 17 illustrates light paths in the light-emitting device according to the comparative example. FIG. 10A illustrates light paths of light emitted from light emitting element 131 at the emission angle of 30 degrees in front view of light-emitting device 130, and FIG. 10B illustrates the light paths in plan view. FIG. 12A illustrates light paths of light emitted from light emitting element 131 at the emission angle of 45 degrees in front view of light-emitting device 130, and FIG. 12B illustrates the light paths in plan view. FIG. 14A illustrates light paths of light emitted from light emitting element 131 at the emission angle of 60 degrees in front view of light-emitting device 130, and FIG. 14B illustrates the light paths in plan view. FIG. 16A illustrates light paths of light emitted from light emitting element 131 at the emission angle of 75 degrees in front view of light-emitting device 130, and FIG. 16B illustrates the light paths in plan view. FIG. 17A illustrates light paths of light emitted from light emitting element 131 at the emission angle of 45 degrees in front view of the light-emitting device according to the comparative example, FIG. 17B illustrates the light paths in plan view, FIG. 17C illustrates light paths of light emitted from light emitting element 131 at the emission angle of 75 degrees in front view of the light-emitting device according to the comparative example, and FIG. 17D illustrates the light paths in plan view.

As illustrated in FIG. 9B to FIG. 10B, it was confirmed that, in the case where the emission angle is 30 degrees, each of the light emitted from light-emitting device 130 according to the present embodiment and the light emitted from the light-emitting device according to the comparative example reach substrate 120. In addition, the light emitted from the light-emitting device according to the comparative example was emitted in the direction along the first virtual line. On the other hand, it was confirmed that the light emitted from light-emitting device 130 according to the present embodiment is emitted in the direction perpendicular to optical axis OA and the first virtual line. In addition, although the simulation results are not shown, in the case where three light emitting elements 131 having different emission light colors are disposed in light-emitting device 130 and the three light emitting elements 131 are turned on, the colors of the light emitted from light emitting elements 131 are mixed by intersection of the light paths. Accordingly, mixed light reaches light diffusion plate 140, and thus color unevenness was successfully suppressed.

As illustrated in FIG. 11B to FIG. 12B and FIG. 17A and FIG. 17B, it was confirmed that, in the case where the emission angle is 45 degrees, the light emitted from light-emitting device 130 according to the present embodiment and the light emitted from the light-emitting device according to the comparative example mainly reach substrate 120. In addition, it was confirmed that the light emitted from light-emitting device 130 according to the present embodiment is emitted in the direction perpendicular to optical axis OA and the first virtual line. On the other hand, the light emitted from the light-emitting device according to the comparative example was emitted in the direction along the first virtual line. It was confirmed that, in comparison with the light emitted from light-emitting device 130 according to the present embodiment at the emission angle of 30 degrees, the light emitted from light-emitting device 130 according to the present embodiment at the emission angle of 45 degrees is emitted to the central axis CA side (see FIG. 11B). Also in this case, in light-emitting device 130 in which three light emitting elements 131 are turned on, the colors of the light emitted from light emitting elements 131 are mixed by intersection of the light paths. Accordingly, mixed light reaches light diffusion plate 140.

As illustrated in FIG. 13B to FIG. 14B, it was confirmed that, in the case where the emission angle is 60 degrees, the quantity of light which reaches light diffusion plate 140 is greater than that of the light which reaches substrate 120 in the light emitted from light-emitting device 130 according to the present embodiment and the light emitted from the light-emitting device according to the comparative example. In addition, it was confirmed that the light emitted from light-emitting device 130 according to the present embodiment is emitted in the direction perpendicular to optical axis OA and the first virtual line. On the other hand, it was confirmed that the light emitted from the light-emitting device according to the comparative example is emitted in the direction along the first virtual line. Also in this case, in light-emitting device 130 in which three light emitting elements 131 are turned on, the colors of the light emitted from light emitting elements 131 are mixed by intersection of the light paths. Accordingly, mixed light reaches light diffusion plate 140.

As illustrated in FIG. 15B, FIG. 16B, FIG. 17C, and FIG. 17D, it was confirmed that, in the case where emission angle is 75 degrees, the quantity of light which reaches substrate 120 is greater than that of the light which reaches light diffusion plate 140 in the light emitted from light-emitting device 130 according to the present embodiment and the light emitted from the light-emitting device according to the comparative example. In addition, it was confirmed that the light emitted from light-emitting device 130 according to the present embodiment is emitted in the direction perpendicular to optical axis OA and the first virtual line. On the other hand, it was confirmed that the light emitted from the light-emitting device according to the comparative example is emitted in the direction along optical axis OA and the first virtual line. Also in this case, in light-emitting device 130 in which three light emitting elements 131 are turned on, the colors of the light emitted from light emitting elements 131 are mixed by intersection of the light paths. Accordingly, mixed light reaches light diffusion plate 140.

In addition, as illustrated in FIG. 9A, FIG. 11A, FIG. 13A and FIG. 15A, it was confirmed that all of the light emitted from light emitting element 131 reaches light diffusion plate 140 in the case where only light emitting element 131 is fixed to substrate 120.

In addition, as illustrated in FIG. 9A, FIG. 11A, FIG. 13A and FIG. 15A, it was confirmed that the light emitted from light emitting element 131 is emitted in first direction D1 and second direction D2. In addition, the light flux controlling member according to the comparative example functions to suppress the emission to the second direction. When the emission to second direction D2 is suppressed as in the light flux controlling member according to the comparative example, dark points are easily formed between light-emitting devices 130 in second direction D2. In view of this, in light flux controlling member 150 according to the present embodiment, a part of light advancing in light guiding part 153 is controlled to be emitted in the second direction with second total reflection surface 154. In this manner, dark points which are easily formed between light-emitting devices 130 in second direction D2 are reduced.

(Effect)

As described above, light flux controlling member 150 according to the present embodiment includes two second total reflection surfaces 154, and controls the light advanced in light guiding part 153 to travel away from the first virtual plane. In addition, the light emitted from light emitting elements 131 in light-emitting device 130 intersect each other, and reach light diffusion plate 140. In this manner, even in the case where a plurality of light emitting elements 131 having different emission light colors are used as the light source, the colors of the light emitted from light emitting elements 131 can be mixed. Consequently, a display device, surface light source device 100, and light-emitting device 130 including light flux controlling member 150 can suppress formation of dark points, and can reduce color unevenness.

(Modification)

Figure 18A:
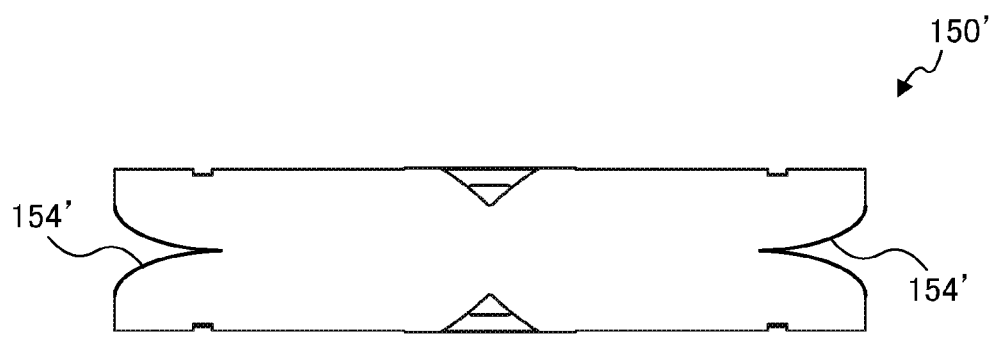
FIG. 18A and FIG. 18B are plan views of a light flux controlling member according to a modification of Embodiment 1 of the present invention.
Figure 18B:
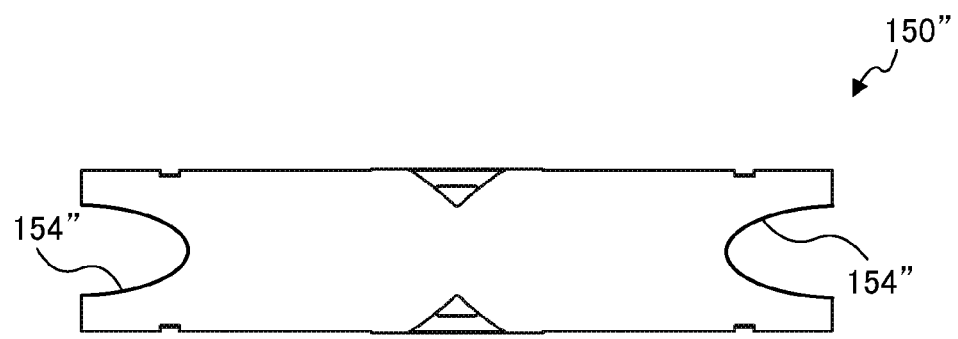

FIG. 18A and FIG. 18B illustrate a second total reflection surface of a light flux controlling member according to a modification of the embodiment of the present invention. FIG. 18A is a plan view of light flux controlling member 150' according to modification 1 in which scattering member 157 is dismounted, and FIG. 18B is a plan view of light flux controlling member 150" according to modification 2 in which scattering member 157 is dismounted. As illustrated in FIG. 18A, the cross-sectional shape of second total reflection surface 154' taken along the second virtual plane may be a curve protruding toward the first virtual line. In addition, as illustrated in FIG. 18B, the cross-sectional shape of second total reflection surface 154" taken along the second virtual plane may be a curve protruding toward the first virtual line. In addition, the cross-sectional shape of second total reflection surface 154" taken along the third virtual plane orthogonal to the first virtual plane and the second virtual plane may be a curve protruding toward bottom surface 158 side, or a curve recessed toward bottom surface 158 side.

While light flux controlling member 150 includes incidence surface 151, first total reflection surface 152, two light guiding parts 153, two second total reflection surfaces 154, two emission surfaces 155, leg part 156 and scattering member 157 in the above-mentioned embodiment, light flux controlling member 150 may not include scattering member 157. That is, the light flux controlling member may be composed of incidence surface 151, first total reflection surface 152, two light guiding parts 153, two second total reflection surfaces 154, two emission surfaces 155, and leg part 156. Even with this configuration, formation of dark points in second direction D2 can be reduced, and color unevenness can be suppressed.

(Embodiment 2)

A surface light source device according to Embodiment 2 can further reduce luminance unevenness on light diffusion plate 140 in second direction D2. The surface light source device according to Embodiment 2 is different from surface light source device 100 according to Embodiment 1 in configuration of light flux controlling member 250 of the light-emitting device. In view of this, the configurations similar to those of surface light source device 100 according to Embodiment 1 will be denoted with the same reference numerals, and the description thereof will be omitted.

(Configuration of Surface Light Source Device)

The surface light source device according to Embodiment 2 includes housing 110, substrate 120, a plurality of light-emitting devices 130 and light diffusion plate 140. A plurality of light-emitting devices 130 are disposed as light-emitting device array 130L such that the major axis of light-emitting device 130 (light flux controlling member 250) extends along first direction D1. In addition, a plurality of the light-emitting device arrays 130L are disposed in second direction D2 (see FIG. 2). In addition, as viewed along second direction D2, a light-emitting device 130 is disposed to overlap another light-emitting device 130 included in a light-emitting device array 130L adjacent to a light-emitting device array 130L that includes the light-emitting device 130 in second direction D2. Further, light-emitting device arrays 130L are disposed such that the interval between adjacent two light-emitting device arrays 130L is constant in second direction D2.

(Configuration of Light Flux Controlling Member)

Figure 19A:
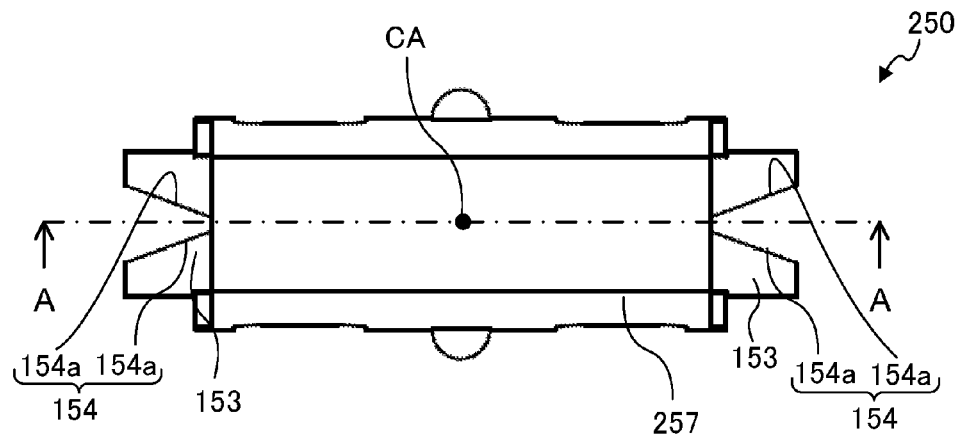
FIG. 19A to FIG. 19C illustrate a configuration of a light flux controlling member according to Embodiment 2.
Figure 19B:
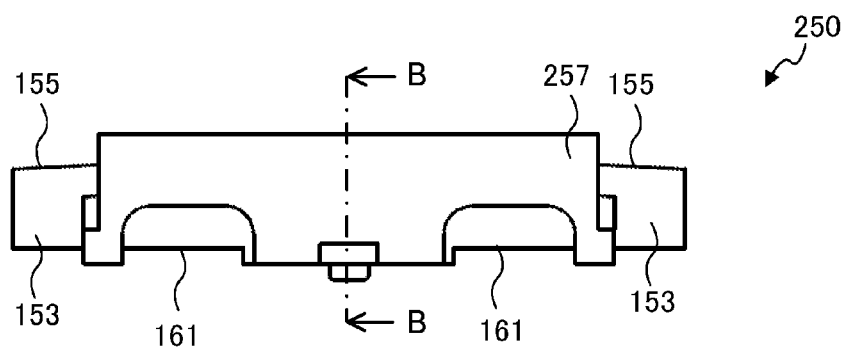
Figure 19C:
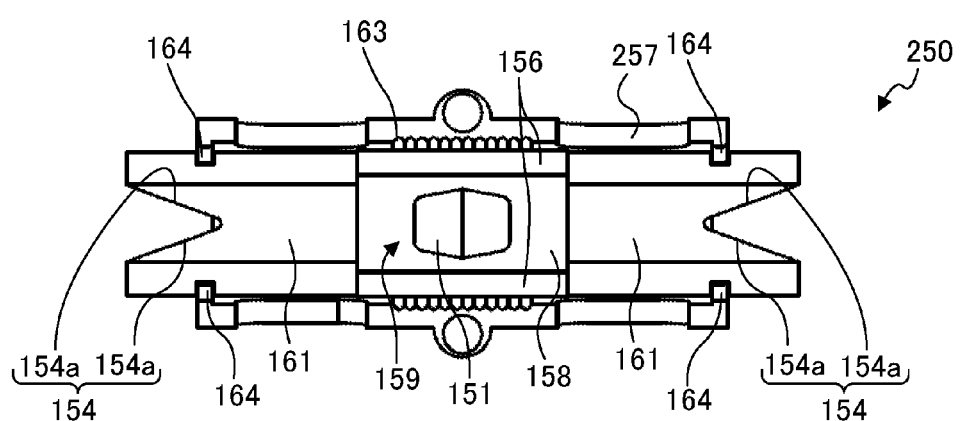
Figure 20A:
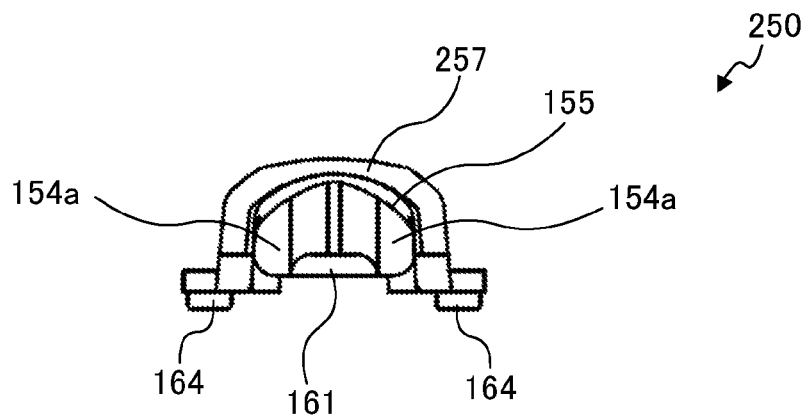
FIG. 20A to FIG. 20C illustrate a configuration of the light flux controlling member according to Embodiment 2.
Figure 20B:
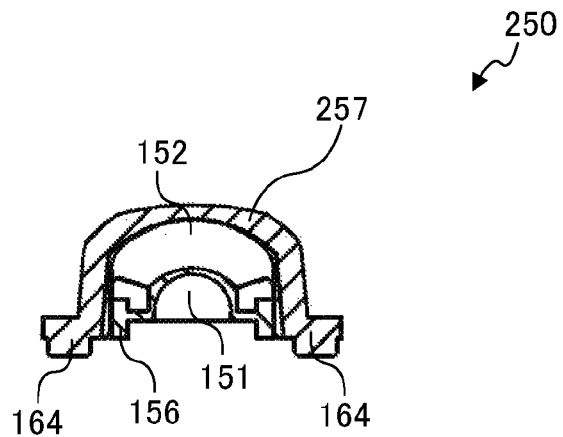
Figure 20C:
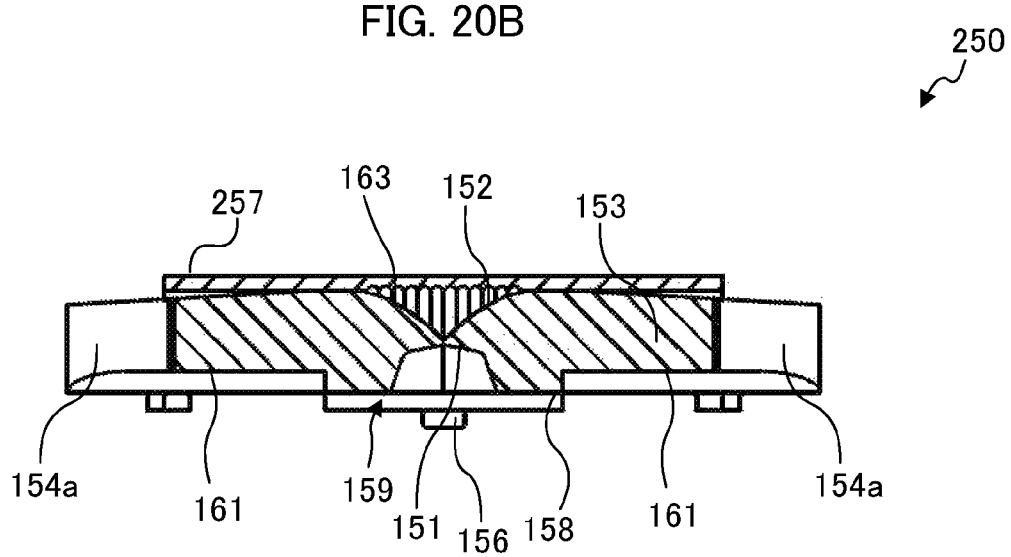
Figure 21A:
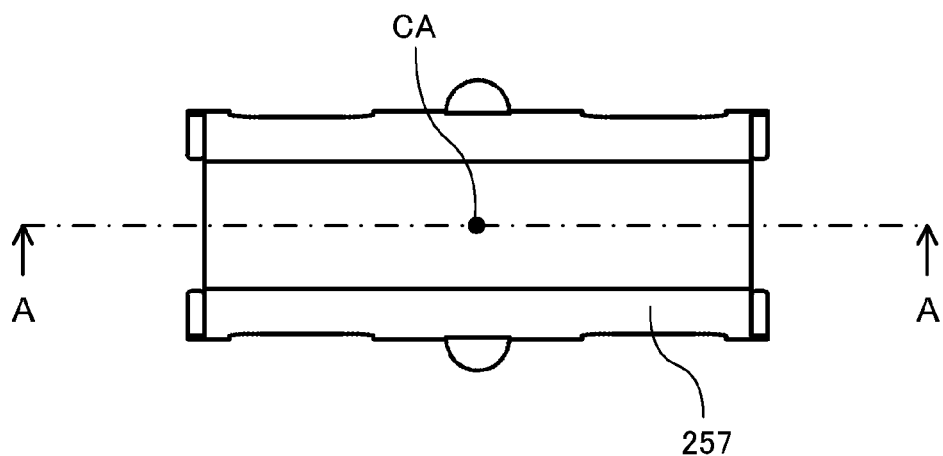
FIG. 21A to FIG. 21C illustrate a configuration of a scattering member.
Figure 21B:
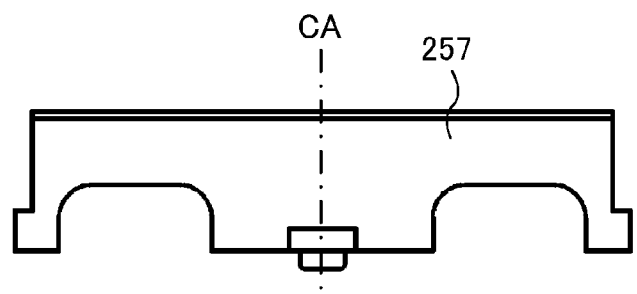
Figure 21C:
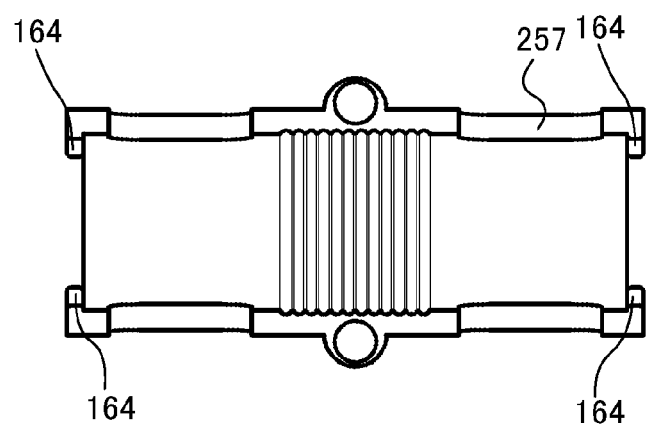
Figure 22:
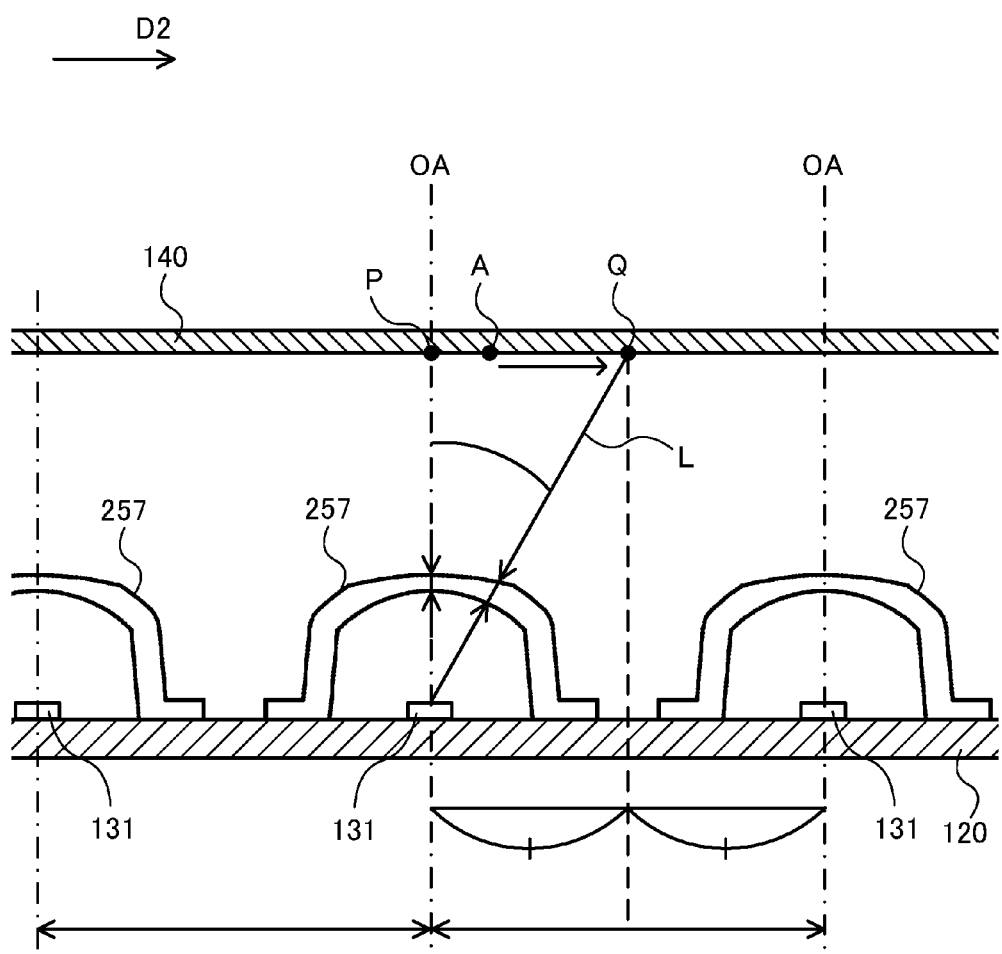
FIG. 22 is used for describing a feature of a scattering member of the light flux controlling member according to Embodiment 2.

FIG. 19A to FIG. 22 illustrate a configuration of light flux controlling member 250 according to Embodiment 2. FIG. 19A is a plan view of light flux controlling member 250, FIG. 19B is a front view of light flux controlling member 250, and FIG. 19C is a bottom view of light flux controlling member 250. In addition, FIG. 20A is a right side view of light flux controlling member 250, FIG. 20B is a sectional view taken along line B-B of FIG. 19B, and FIG. 20C is a sectional view taken along line A-A of FIG. 19A. FIG. 21A is a plan view of scattering member 257, FIG. 21B is a front view of scattering member 257, and FIG. 21C is a bottom view of scattering member 257. FIG. 22 is used for describing a feature of scattering member 257. It is to be noted that the main body of the light flux controlling member is omitted in FIG. 22.

As illustrated in FIG. 19A to FIG. 21C, light flux controlling member 250 includes incidence surface 151, first total reflection surface 152, two light guiding parts 153, two second total reflection surfaces 154, two emission surfaces 155, leg part 156, and scattering member 257.

Scattering member 257 is a member that is provided separately from the light flux controlling member main body including incidence surface 151, first total reflection surface 152, light guiding part 153, second total reflection surface 154 and emission surface 155. Mainly, scattering member 257 allows transmitted light which has not been reflected by first total reflection surface 152 to pass therethrough while diffusing the light. Scattering member 257 according to Embodiment 2 has a cross-sectional shape of a temple bell-like shape (inverted U-shape). That is, in a cross-section parallel to second direction D2, a part of the internal surface of scattering member 257 has a substantially semi-circular shape. A plurality of prism rows 163 having a substantially triangular cross-sectional shape or a semicircular cross-sectional shape are disposed on the internal surface of scattering member 257. Engagement protrusions 164 that engage with guide engagement grooves 162 are disposed at end portions of scattering member 257 on light emitting element 131 side. On the other hand, the external surface of scattering member 257 has a predetermined shape described later.

Here, with reference to FIG. 22, a feature of scattering member 257 of light flux controlling member 250 according to Embodiment 2 is described. Here, as illustrated in FIG. 22, a cross-section of scattering member 257 taken along a third virtual plane that includes optical axis OA and is perpendicular to the first virtual line is described. It is assumed here that point A which can move in the second direction is located on the surface of light diffusion plate 140 on light emitting element 131 side. In addition, intersection P is the intersection of optical axis OA of light emitting element 131 and the surface of light diffusion plate 140 on light emitting element 131 side. In addition, intermediate point Q is the middle point of adjacent two light-emitting device arrays 130L on the surface of light diffusion plate 140 on light emitting element 131 side. Further, the straight line connecting the light emission center of light emitting element 131 and point A is a fourth virtual line. It is to be noted that, in the following description, the smaller angle between optical axis OA and a virtual line connecting the light emission center of light emitting element 131 and intermediate point Q is also referred to as "middle point angle."

Scattering member 257 is formed such that the thickness of scattering member 257 on the fourth virtual line increases as point A goes from intersection P toward intermediate point Q when point A is moved from intersection P to intermediate point Q. It is to be noted that, in the present embodiment, scattering member 257 is formed such that the thickness of scattering member 257 on the fourth virtual line is largest when point A is located on intermediate point Q. That is, the thickness of scattering member 257 on the fourth virtual line after point A has passed through intermediate point Q is equal to or smaller than the thickness of scattering member 257 on the fourth virtual line in the state where point A is located on intermediate point Q. It is to be noted that, in the following description, the smaller angle of optical axis OA and the fourth virtual line at which the thickness of scattering member 257 on the fourth virtual line is largest is also referred to as "maximum thickness angle." For example, in a cross-section taken along the third virtual plane, the curvature of the external surface of scattering member 257 having the above-mentioned shape is smaller than the curvature of the internal side of scattering member 257. For example, in the above-mentioned cross-section, the curvature the external surface of scattering member 257 is 0.5 times the curvature of the internal side of scattering member 257. In addition, as long as the thickness of scattering member 257 on the fourth virtual line satisfies the above-described condition, the internal surface and the external surface in a cross section of scattering member 257 taken along the third virtual plane may not be an arc. For example, it is possible to adopt a configuration in which the internal surface of scattering member 257 is an arc while the external surface thereof is straight lines.

It is to be noted that, in Embodiment 1, scattering member 157 is formed such that the thickness of scattering member 157 on the fourth virtual line L does not change when point A is moved from intersection P to intermediate point Q (see FIG. 5A).

(Simulation)

Next, the arrival position on light diffusion plate 140 of light emitted from light emitting element 131 disposed at the center of light-emitting element array 131L was simulated.

In this simulation, a device in which scattering member 257 is mounted on fixed substrate 120 on which three light emitting elements 131 are fixed was used. That is, the light flux controlling member main body was not used in this simulation, and only the effect of scattering member 257 was examined. In addition, the distance between substrate 120 and light diffusion plate 140 was set to 12 mm. Further, only one light emitting element 131 disposed at the center portion of three light emitting elements 131 was turned on. It is to be noted that, the light path in this simulation is symmetric about central axis CA in FIG. 19A in the horizontal direction in FIG. 19A (longitudinal axial direction) and in the vertical direction in FIG. 19A (minor axis direction), and therefore the arrival position of light emitted in the right upward direction with respect to central axis CA in FIG. 19A was simulated. In addition, the arrival positions of light emitted at four emission angles of 15, 20, 25 and 30 degrees to optical axis OA were simulated. In addition, the arrival positions of light having seven angles of 0 (which corresponds to light parallel to the first virtual line), 15, 30, 45, 60, 75, and 90 degrees to the first virtual line (28 patterns in total) in a cross-section taken along the second virtual plane perpendicular to optical axis OA were simulated for each emission angle. It is to be noted that, in this simulation, scattering member 157 of light flux controlling member 150 according to Embodiment 1 and scattering member 257 of light flux controlling member 250 according to Embodiment 2 were used.

FIG. 23A to FIG. 24B illustrate the arrival positions on light diffusion plate 140 of light emitted from light emitting element 131 at each emission angle and controlled by scattering members 157 and 257.

Figure 23A:
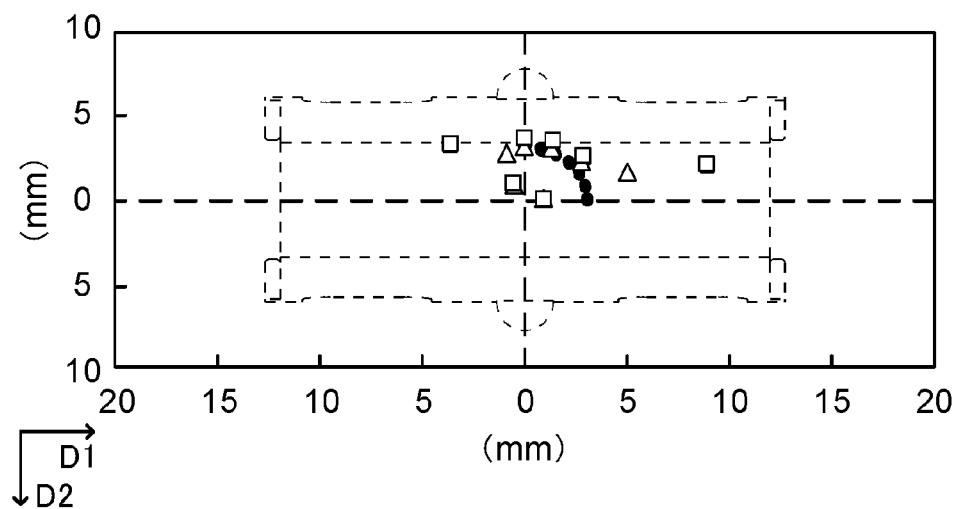
FIG. 23A and FIG. 23B illustrate arrival positions on the light diffusion plate of light emitted from the light emitting element at emission angles of 15 degrees and 20 degrees.
Figure 23B:
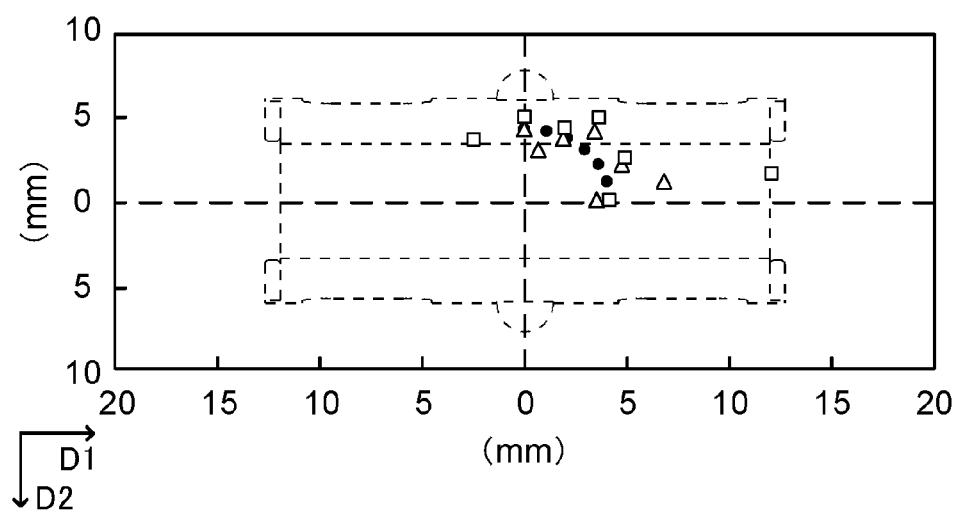
Figure 24A:
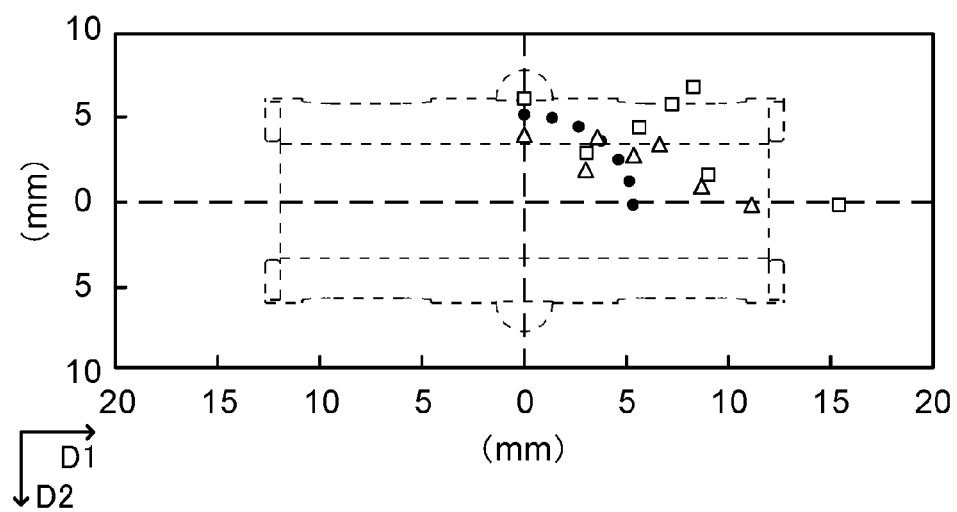
FIG. 24A and FIG. 24B illustrate arrival positions on the light diffusion plate of light emitted from light emitting element at emission angles of 25 and 30 degrees.
Figure 24B:
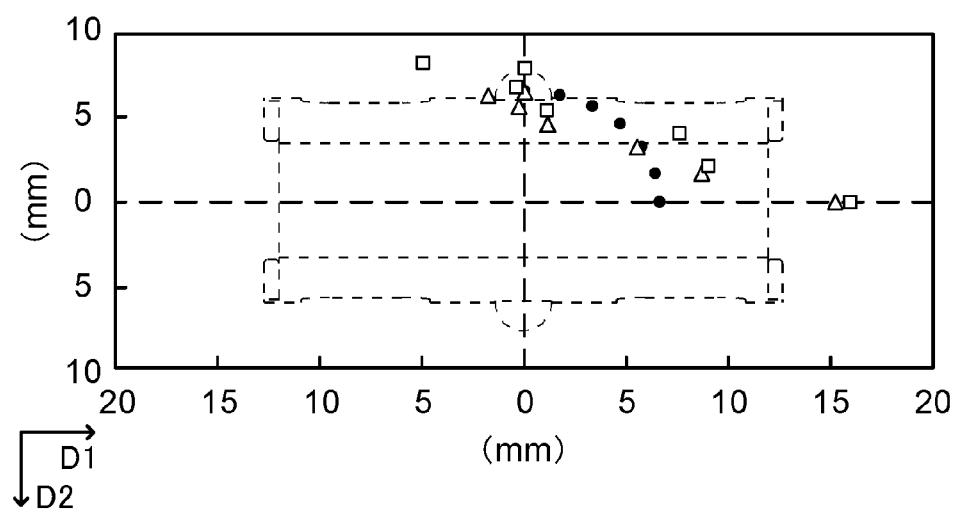

FIG. 23A illustrates the arrival positions on light diffusion plate 140 of the light emitted from light emitting element 131 at the emission angle of 15 degrees and controlled by scattering members 157 and 257, and FIG. 23B illustrates the arrival positions on light diffusion plate 140 of light emitted from light emitting element 131 at the emission angle of 20 degrees and controlled by scattering members 157 and 257. In addition, FIG. 24A illustrates the arrival positions on light diffusion plate 140 of light emitted from light emitting element 131 at the emission angle of 25 degrees and controlled by scattering members 157 and 257, and FIG. 24B illustrates the arrival positions on light diffusion plate 140 of light emitted from the light emitting element at the emission angle of 30 degrees and controlled by scattering members 157 and 257.

In FIG. 23A to FIG. 24B, the abscissa and the ordinate indicate the distance (mm) from the light emission point (the center of light emitting element 131) in the direction orthogonal to light axis OA. In addition, in FIG. 23A to FIG. 24B, the position of scattering member 257 in plan view is indicated with the dotted line. In FIG. 23A to FIG. 24B, the black circle marks indicate the arrival positions of light in the case where only light emitting element 131 is disposed on substrate 120, the white triangle marks indicate the arrival positions of light controlled by scattering member 157 according to Embodiment 1, and the white square marks indicate the arrival positions of light controlled by scattering member 257 according to Embodiment 2.

As illustrated in FIG. 23A and FIG. 23B, the light emitted from light emitting element 131 at emission angles of 15 degrees and 20 degrees is more expanded in the longitudinal direction of scattering members 157 and 257 (first direction D1) in the case where scattering members 157 and 257 were used in comparison with the case where the scattering member was not used. In addition, as illustrated in FIG. 24A and FIG. 24B, the light emitted from light emitting element 131 at emission angles of 25 degrees and 30 degrees is more expanded not only in the longitudinal direction (first direction D1) but also in the short direction (second direction D2) of scattering members 157 and 257 in the case where scattering members 157 and 257 were used in comparison with the case where the scattering member was not used.

Next, the luminance distribution was simulated with surface light source devices including the light-emitting devices including light flux controlling members 150 and 250 using the combinations of the light flux controlling member main body and scattering members 157 and 257. In this simulation, in a cross-section taken along the third virtual plane, the luminance distribution on the line of intersection with the third virtual plane on light diffusion plate 140 was examined. It is to be noted that the middle point angle was 30 degrees in this simulation.

It is to be noted that light-emitting device 130 according to Embodiment 1 and the light-emitting device according to Embodiment 2 were used in this simulation. In addition, for comparison, the simulation was conducted also with light-emitting devices A and B in which the position of point A where the thickness of the scattering member on the fourth virtual line is largest is located between intersection P and intermediate point Q. Light-emitting device A includes a scattering member having a maximum thickness angle of 23 degrees, and light-emitting device B includes a scattering member having a maximum thickness angle of 15 degrees.

Figure 25A:
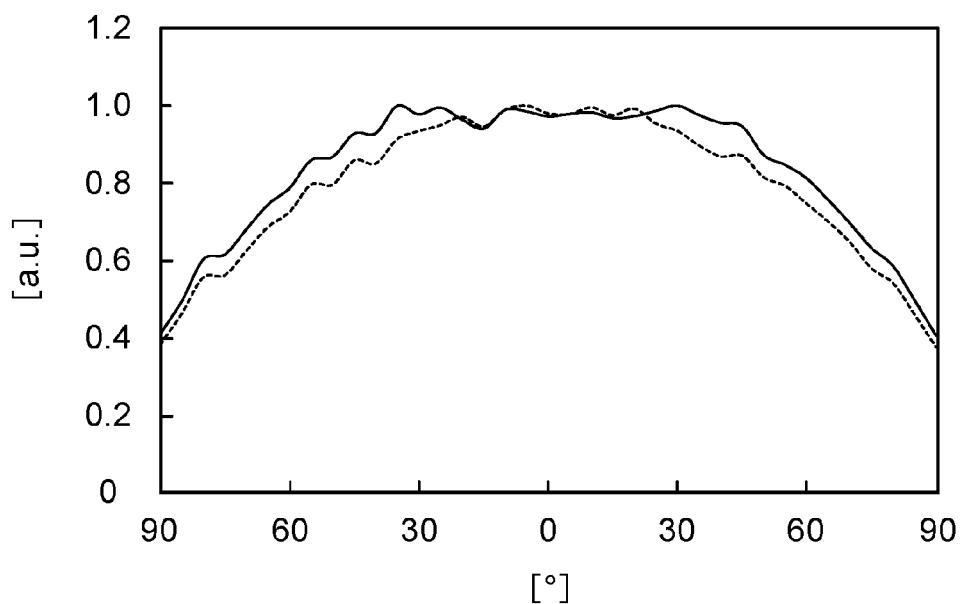
FIGS. 25A and 25B are graphs showing a luminance distribution on the light diffusion plate.
Figure 25B:
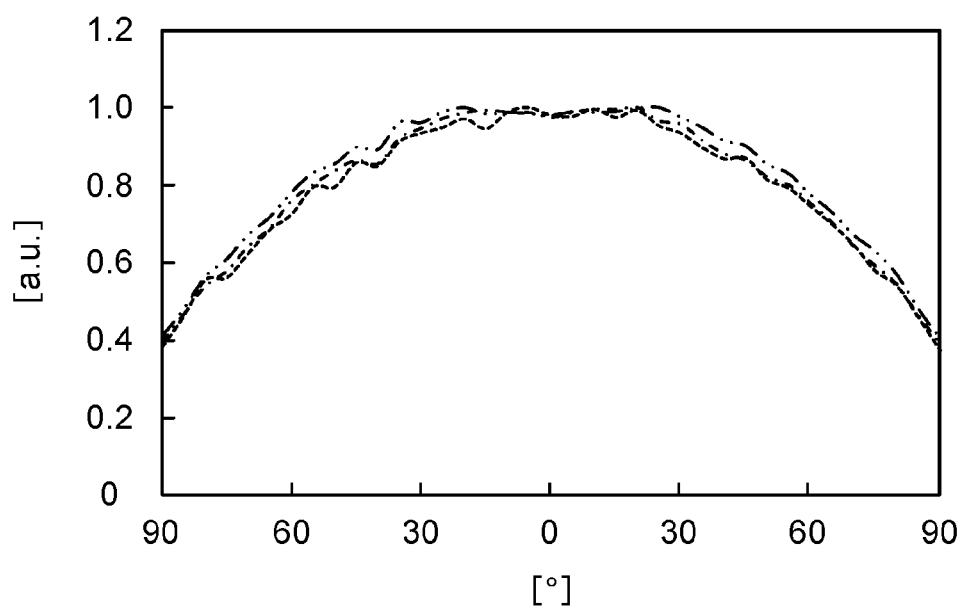

FIG. 25A and FIG. 25B are graphs showing the luminance distribution on light diffusion plate 140 on the line of intersection with the third virtual plane. FIG. 25A shows a luminance distribution in light-emitting device 130 according to Embodiment 1 and the light-emitting device according to Embodiment 2, and FIG. 25B shows a luminance distribution in light-emitting device 130 according to Embodiment 1, light-emitting device A and light-emitting device B. In FIG. 25A and FIG. 25B, the abscissa indicates the angle (°) to optical axis OA of a virtual line connecting the light emission center of light emitting element 131 and the point on light diffusion plate 140, and the ordinate indicates the luminance with the maximum value set to "1." The broken line of FIG. 25A and FIG. 25B indicates a result obtained with light-emitting device 130 according to Embodiment 1, the solid line of FIG. 25A indicates a result obtained with the light-emitting device according to Embodiment 2, the dashed line of FIG. 25B indicates a result obtained with light-emitting device A, and the chain double-dashed line of FIG. 25B indicates a result obtained with light-emitting device B.

As illustrated in FIG. 25A, the luminance peak was around 30 degrees in the light-emitting device according to the present embodiment in which the middle point angle and the maximum thickness angle are equal to each other (30 degrees). Accordingly, it can be said that, in the surface light source device in which the light-emitting devices are disposed at a constant interval in second direction D2 such that the middle point angle is 30 degrees, each light-emitting device can uniformly illuminate the range from the direct upper point of light emitting element 131 to adjacent two intermediate points Q in second direction D2. In addition, although the simulation results are not shown, in the case where three light emitting elements 131 having different emission light colors are disposed in the light-emitting device and the three light emitting elements 131 are turned on, the colors of the light emitted from light emitting elements 131 are mixed by intersection of the light paths. Accordingly, mixed light reaches light diffusion plate 140, and thus color unevenness was successfully suppressed. Therefore, it can be recognized that the surface light source device including the above-mentioned light-emitting device causes less luminance unevenness between the light-emitting device arrays as a whole, and can reduce color unevenness. On the other hand, in the case of light-emitting devices A and B in which the maximum thickness angle is smaller than the middle point angle, the angle of the peak of the luminance was smaller than 30 degrees. This result indicates that, in the surface light source device in which the light-emitting devices are disposed in second direction D2 such that the middle point angle is 30 degrees, luminance unevenness is caused between the light-emitting device arrays.

(Effect)

As described above, in the surface light source device according to the present embodiment, light flux controlling member 250 is formed such that the middle point angle and the maximum thickness angle are equal to each other. Therefore, luminance unevenness between the light-emitting device arrays can be reduced while achieving the effect of Embodiment 1.

(Modification)

Figure 26A:
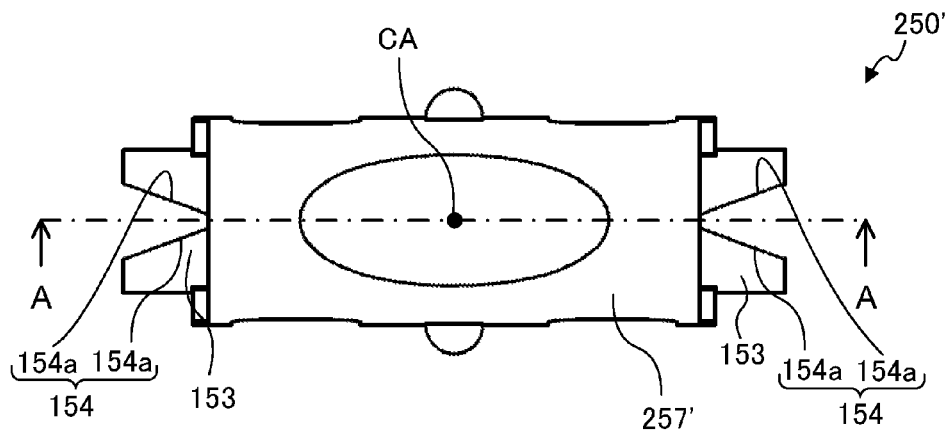
FIG. 26A to FIG. 26C illustrate a configuration of a light flux controlling member according to a modification of Embodiment 2.
Figure 26B:
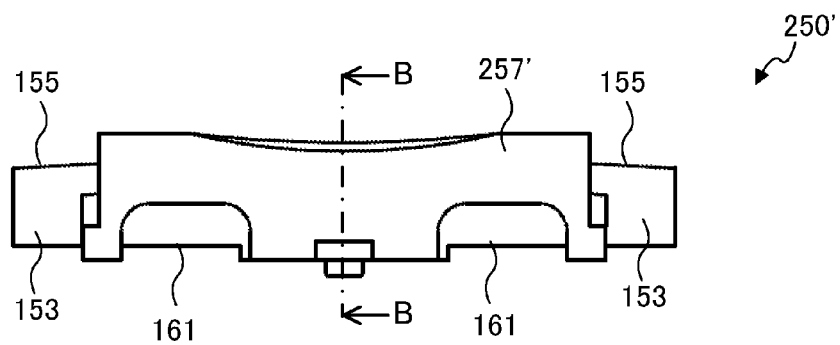
Figure 26C:
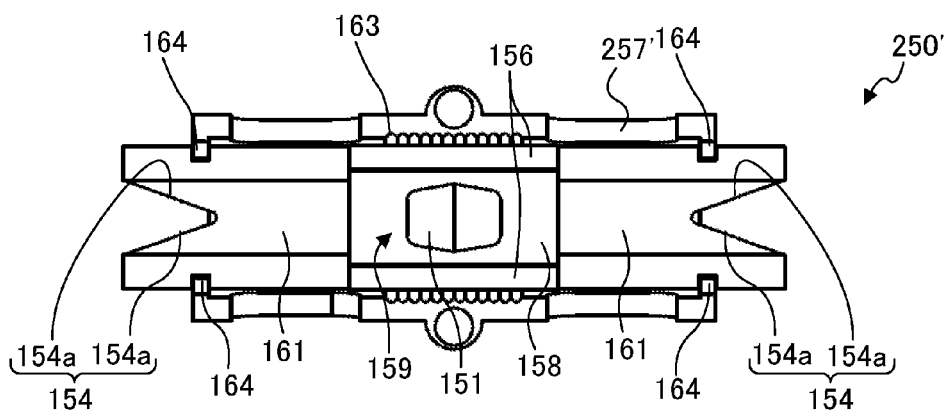
Figure 27A:
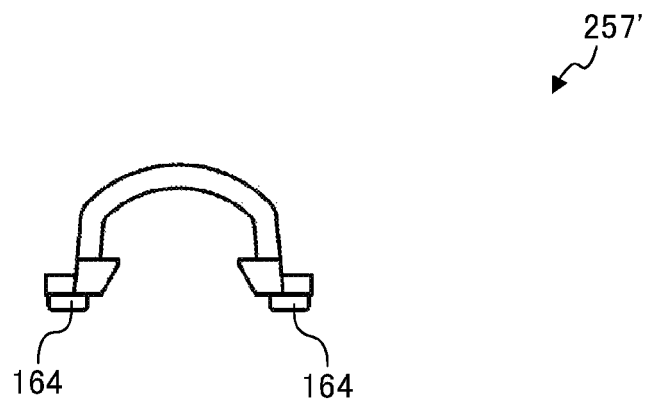
FIG. 27A to FIG. 27C illustrate a configuration of the light flux controlling member according to the modification of Embodiment 2.
Figure 27B:
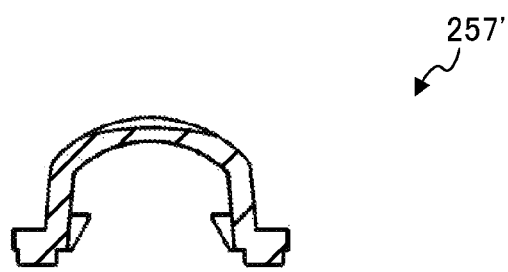
Figure 27C:
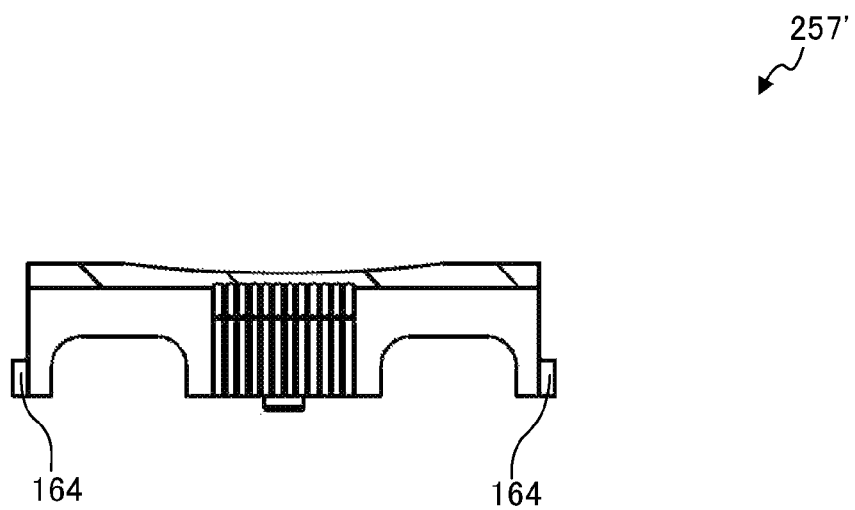

FIG. 26A to FIG. 27C illustrate a configuration of light flux controlling member 250' according to a modification of Embodiment 2. FIG. 26A is a plan view of light flux controlling member 250' according to the modification of Embodiment 2, FIG. 26B is a front view of light flux controlling member 250', and FIG. 26C is a bottom view of light flux controlling member 250'. In addition, FIG. 27A is a right side view of light flux controlling member 350, FIG. 27B is a sectional view taken along line B-B of FIG. 26B, and FIG. 27C is a sectional view taken along line A-A of FIG. 26A.

As illustrated in FIG. 26A to FIG. 27C, a recess may be formed on the external surface of scattering member 257' of light flux controlling member 250' according to the modification of Embodiment 2. Also in this case, scattering member 257' is formed such that the maximum thickness angle and the middle point angle are equal to each other in a cross-section taken along the third virtual plane. In addition, although not illustrated in the drawings, light diffusion plate 140 was uniformly illuminated by the surface light source device of light flux controlling member 250' according to the modification of Embodiment 2.

While light-emitting devices 130 are disposed in matrix in the above-mentioned embodiment, light-emitting devices 130 may be disposed in other fashions. As viewed along second direction D2, light-emitting element array 131L may be disposed between two light-emitting element arrays 131L adjacent to each other in first direction D1 included in light-emitting device array 130L adjacent to light-emitting device array 130L that includes the light-emitting device 130 in second direction D2.

In addition, the order of light emitting elements 131 in two light-emitting devices adjacent to each other in first direction D1 may be identical to each other or different from each other. In the case where the order of light emitting elements 131 is identical to each other, the order of light emitting elements 131 in two light-emitting devices adjacent to each other in second direction D2 are different from each other.

INDUSTRIAL APPLICABILITY

A surface light source device including the light flux controlling member according to the embodiments of the present invention is applicable to a backlight of a liquid crystal display, a sign board, a generally-used illumination apparatus and the like, for example.

REFERENCE SIGNS LIST

100 Surface light source device
110 Housing
120 Substrate
130 Light-emitting device
130L Light-emitting device array
131 Light emitting element
131L Light-emitting element array
140 Light diffusion plate
150, 150', 150", 250, 250' Light flux controlling member
151 Incidence surface
152 First total reflection surface
153 Light guiding part
154, 154', 154" Second total reflection surface
155 Emission surface
156 Leg part
157, 257, 257' Scattering member
158 Bottom surface
159 First recess
160 Reinforcement member
161 Second recess
162 Guide engagement groove
163 Prism rows
164 Engagement protrusion CA Central axis of light flux controlling member
OA Optical axis of light emitting element

The invention claimed is:

1. A light flux controlling member configured to control a distribution of light emitted from a light emitting element, the light flux controlling member comprising:
   an incidence surface on which light emitted from the light emitting element is incident;
   a first total reflection surface formed at a position opposite to the light emitting element with respect to the incidence surface, and configured to reflect a part of light incident on the incidence surface in opposite two directions which are substantially perpendicular to an optical axis of the light emitting element;
   two light guiding parts formed to face each other, with the incidence surface and the first total reflection surface therebetween, and configured to guide a part of the light incident on the incidence surface and light reflected by the first total reflection surface in a direction away from the incidence surface and the first total reflection surface;
   two second total reflection surfaces disposed at respective end portions of the two light guiding parts and formed such that a distance between the second total reflection surface and a virtual plane increases as the second total reflection surface extends from the end portions, the virtual plane including the optical axis and a first virtual line which intersects the optical axis and extends in an extending direction of the two light guiding parts, the two second total reflection surfaces being surfaces on which light which is incident on the incidence surface and directly reaches the two second total reflection surfaces is incident at an angle equal to or greater than a critical angle, the two second total reflection surfaces being configured to reflect the light; and
   two emission surfaces formed on respective external surfaces of the two light guiding parts, and configured to emit light guided by the light guiding parts to outside.

2. The light flux controlling member according to claim 1 further comprising a scattering member configured to scatter light emitted to outside from the first total reflection surface, wherein:
   the scattering member is disposed to cover at least a part of the first total reflection surface; and
   a plurality of prism rows are disposed on an internal surface of the scattering member.

3. A light-emitting device comprising:
   a light emitting element; and
   the light flux controlling member according to claim 2 disposed to intersect an optical axis of the light emitting element.

4. The light flux controlling member according to claim 1, wherein each of the two second total reflection surfaces includes two inclined surfaces which are formed such that a distance between the inclined surface and the virtual plane decreases from the end portion toward the optical axis in a cross-section perpendicular to the optical axis.

5. A light-emitting device comprising:
   a light emitting element; and
   the light flux controlling member according to claim 4 disposed to intersect an optical axis of the light emitting element.

6. The light flux controlling member according to claim 4 further comprising a scattering member configured to scatter light emitted to outside from the first total reflection surface, wherein:
   the scattering member is disposed to cover at least a part of the first total reflection surface; and
   a plurality of prism rows are disposed on an internal surface of the scattering member.

7. A light-emitting device comprising:
   a light emitting element; and
   the light flux controlling member according to claim 6 disposed to intersect an optical axis of the light emitting element.

8. A light-emitting device comprising:
   a light emitting element; and
   the light flux controlling member according to claim 1 disposed to intersect an optical axis of the light emitting element.

9. The light-emitting device according to claim 8 wherein:
   a plurality of the light emitting elements are disposed; and
   colors of emission light from respective light emitting elements are different from each other.

10. A surface light source device comprising:
    a plurality of the light-emitting devices according to claim 9; and
    a light diffusion plate configured to allow light emitted from the light-emitting devices to pass therethrough while diffusing the light, wherein:
    the plurality of light-emitting devices are disposed as a light-emitting device array such that the first virtual line extends along a first direction, and
    a plurality of the light-emitting device arrays are disposed in a second direction perpendicular to the first direction.

11. A display device comprising:
    the surface light source device according to claim 10; and
    a member to be irradiated to which light emitted from the surface light source device is applied.

12. The surface light source device according to claim 10, wherein:
    each of the plurality of light-emitting devices further includes a scattering member configured to scatter light emitted to outside from the first total reflection surface;
    the scattering member is disposed to cover at least a part of the first total reflection surface;
    a plurality of prism rows are disposed on an internal surface of the scattering member;
    in a cross-section taken along a third virtual plane which includes the optical axis and is perpendicular to the first virtual line,
    the light-emitting device arrays are disposed such that a distance between adjacent two light-emitting element arrays is constant; and
    the scattering member is formed such that,
    when a point A on a surface on the light emitting element side of the light diffusion plate is moved from an intersection between the optical axis and the light diffusion plate to an intermediate point between adjacent two light-emitting device arrays on the surface on the light emitting element side of the light diffusion plate,
    a thickness of the scattering member on a fourth virtual line connecting a light emission center of the light emitting element and the point A increases as the point A moves from the intersection toward the intermediate point.

13. A display device comprising:
    the surface light source device according to claim 12; and
    a member to be irradiated to which light emitted from the surface light source device is applied.

14. The surface light source device according to claim 12 wherein the scattering member is formed such that the thickness of the scattering member on the fourth virtual line is largest when the point A is located on the intermediate point.

15. A display device comprising:
   the surface light source device according to claim 14; and
   a member to be irradiated to which light emitted from the surface light source device is applied.

* * * * *